(12) United States Patent
Calvert et al.

(10) Patent No.: US 8,459,285 B2
(45) Date of Patent: Jun. 11, 2013

(54) SLUG MITIGATION

(75) Inventors: Patrick James Calvert, Sheriff Hutton (GB); Paul Roderick Allen Oram, Haslemere (GB)

(73) Assignee: BP Exploration Operating Company Limited, Middlesex (GB)

( * ) Notice: Subject to any disclaimer, the term of this patent is extended or adjusted under 35 U.S.C. 154(b) by 408 days.

(21) Appl. No.: 12/736,705

(22) PCT Filed: Apr. 21, 2009

(86) PCT No.: PCT/GB2009/001018
§ 371 (c)(1),
(2), (4) Date: Nov. 2, 2010

(87) PCT Pub. No.: WO2009/133343
PCT Pub. Date: Nov. 5, 2009

(65) Prior Publication Data
US 2011/0048544 A1    Mar. 3, 2011

(30) Foreign Application Priority Data

May 2, 2008   (GB) .................................. 08251605.5

(51) Int. Cl.
*E21B 49/00*   (2006.01)
(52) U.S. Cl.
USPC ..................... 137/14; 137/487.5; 166/250.03; 702/50; 73/861.04
(58) Field of Classification Search
USPC ........ 137/2, 14, 487, 487.5, 489; 166/250.03; 702/50; 73/861.04
See application file for complete search history.

(56) References Cited

U.S. PATENT DOCUMENTS

| 5,478,504 A | * | 12/1995 | de Almeida Barbuto ..... 137/110 |
| 5,544,672 A | | 8/1996 | Payne et al. |

(Continued)

FOREIGN PATENT DOCUMENTS

| GB | 2 282 399 | 4/1995 |
| WO | WO 97/45716 | 12/1997 |
| WO | WO 02/46577 | 6/2002 |
| WO | WO 2004/057153 | 7/2004 |
| WO | WO 2006/120537 | 11/2006 |

OTHER PUBLICATIONS

International Search Report for PCT/GB2009/001018, mailed Jul. 17, 2009.

(Continued)

*Primary Examiner* — Eric Keasel
(74) *Attorney, Agent, or Firm* — Nixon & Vanderhye

(57) ABSTRACT

A method and apparatus for mitigating slug formation in a multiphase fluid stream that is flowing through a conduit wherein the conduit comprises a first portion and a second portion which is upwardly inclined to the first portion and wherein the multiphase fluid stream comprises a gaseous phase and a liquid phase, the method comprising the steps of: (a) determining the pressure in the conduit upstream of a slugging zone; (b) determining the pressure in the conduit downstream of the slugging zone; (c) determining the actual pressure difference across the slugging zone by subtracting the downstream pressure from step (b) from the upstream pressure from step (a); (d) determining the error between a target pressure difference and the actual pressure difference; (e) producing a signal comprising a first component which is proportional to the error and a second component which is proportional to the rate of change of the error over time; and (f) using the signal produced in step (e) to control the position of an adjustable choke valve located downstream of the slugging zone so as to stabilize variations arising in the actual pressure difference over time.

15 Claims, 15 Drawing Sheets

U.S. PATENT DOCUMENTS

| | | | | |
|---|---|---|---|---|
| 5,708,211 | A * | 1/1998 | Jepson et al. | 73/861.04 |
| 6,041,803 | A * | 3/2000 | De Almeida et al. | 137/14 |
| 6,352,109 | B1 * | 3/2002 | Buckman, Sr. | 166/250.03 |
| 6,390,114 | B1 * | 5/2002 | Haandrikman et al. | 137/2 |
| 7,222,542 | B2 * | 5/2007 | Eken et al. | 73/861.63 |
| 7,239,967 | B2 * | 7/2007 | Havre | 702/50 |
| 7,434,621 | B2 * | 10/2008 | Aarvik et al. | 166/267 |
| 7,543,596 | B2 * | 6/2009 | Laverdiere et al. | 137/14 |
| 8,082,946 | B2 * | 12/2011 | Laverdiere et al. | 137/487.5 |
| 2005/0173003 | A1 * | 8/2005 | Laverdiere et al. | 137/487.5 |
| 2006/0041392 | A1 * | 2/2006 | Korske | 702/50 |

OTHER PUBLICATIONS

Written Opinion of the International Searching Authority for PCT/GB2009/001018, mailed Jul. 17, 2009.

Executed Declaration of Patrick James Calvert, dated Feb. 13, 2013, an attendee at the Hydro Research Forum 2007 on "Stabilization of Unstable Wells", held Jun. 4 and 5, 2007, (2 pgs).

Memo in Summary from Hydro Research Forum 2007 on "Stabilization of Unstable Wells", Jun. 4 and 5, 2007, 2 pgs.

Slide pack presentation titled, "Slug Prediction and Mitigation within BP", pp. 1-3, dated Jan. 31, 2013.

* cited by examiner

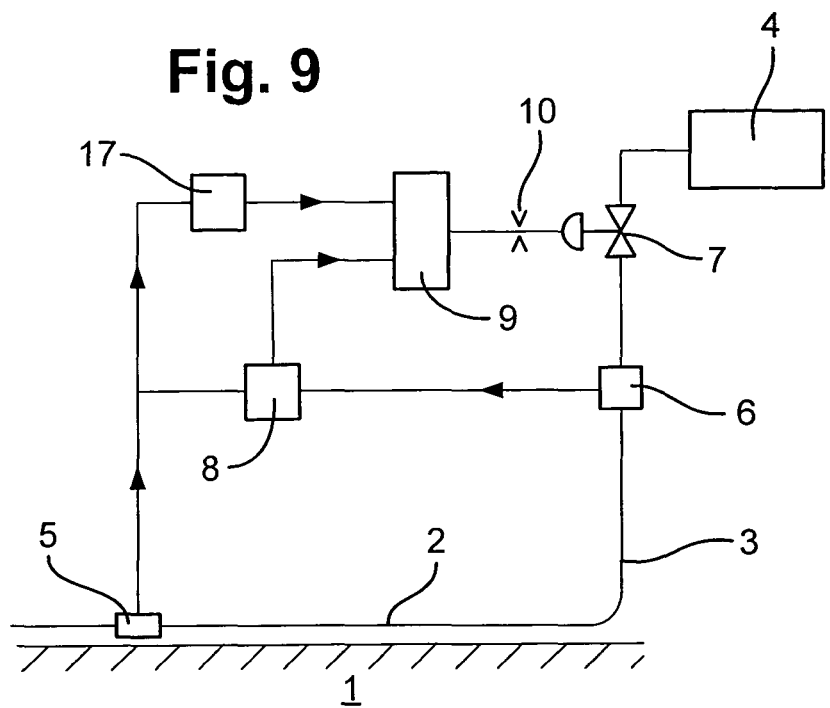
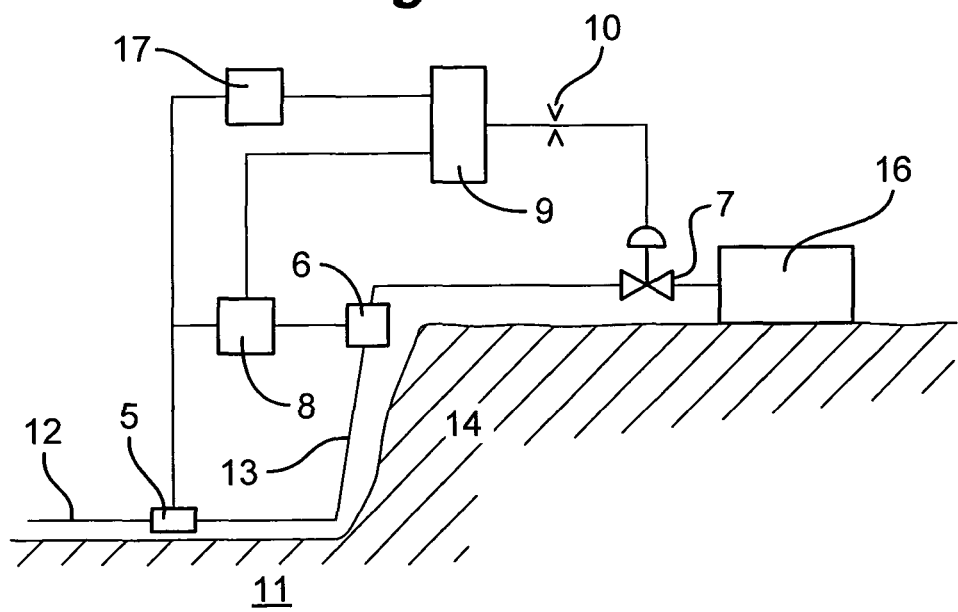

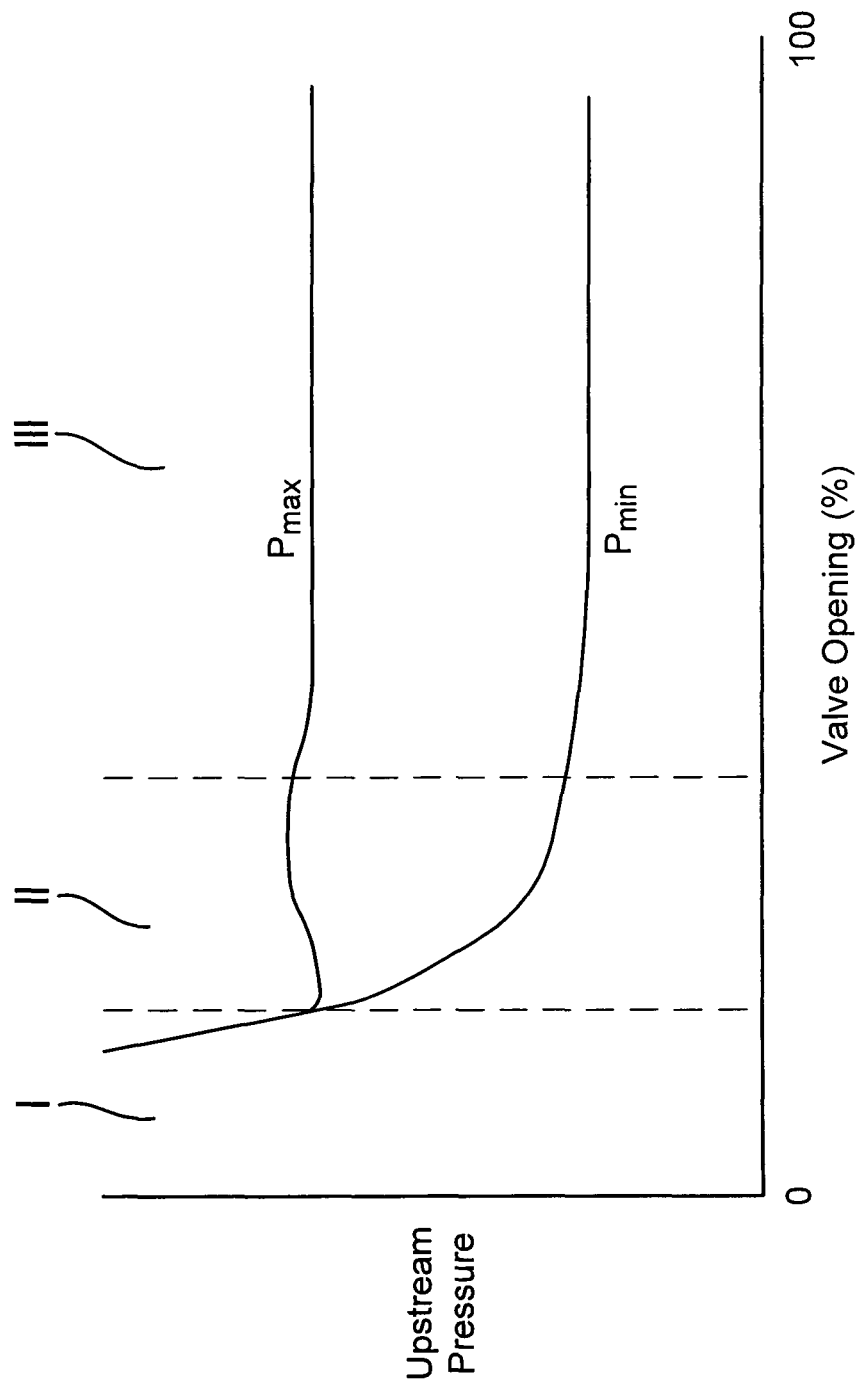

SLUG MITIGATION

This application is the U.S. national phase of International Application No. PCT/GB2009/001018 filed 21 Apr. 2009, which designated the U.S. and claims priority to EP Application No. 08251605.5 filed 2 May 2008, the entire contents of each of which are hereby incorporated by reference.

This invention relates to a method and system for mitigating slug formation in a multiphase fluid stream that is flowing through a conduit.

Conduits carrying multiphase fluids are used in the oil and gas production industry for transporting multiphase fluid streams comprising a liquid phase (typically, comprising oil and/or gas condensate and produced water) and a gaseous phase from one point to another point across the earth's surface. In certain conduit configurations, "slugging" flow can occur. This condition refers to the situation where the flow rate of the separate gaseous and liquid phases to the production facility is not steady and oscillates between largely (or all) gas and largely (or all) liquid. Two common forms of slugging are severe slugging and hydrodynamic slugging.

The classical example of severe slugging occurs when two conditions are fulfilled. These are:

(i) a first portion of conduit leading to a sharply inclined second portion of conduit;

(ii) a low velocity of the multiphase flow leading to a stratified fluid stream.

Thus, the conditions in the first portion of conduit, such as the velocity of the multiphase fluid flow, can create the situation under which the stream in the first portion of conduit assumes a stratified-type flow pattern, with the gas flowing above the liquid. This segregation of the gas into the upper part of the first portion of conduit is the determining factor for the establishment of the severe-slugging phenomenon.

Situations in which severe slugging has been observed include deviated wells and conduits which extend from offshore production wells to a nearby surface production facility. In the former situation, the deviated well may be connected either to a common flow path, known as the manifold, or directly to the gas-liquid separator. In the latter situation, a pipeline located on the seabed is typically connected to an ascending underwater flow line, known as a "riser", which conveys the produced fluids up to the surface production facility which normally has a gas-liquid separator for separating the gaseous phase from the liquid phase.

Severe slugging is characterized by a cyclical four-stage process, as follows:

Stage I: The multiphase flow does not have sufficient energy to transport the liquid up the inclined second section of pipeline and the liquid therefore accumulates at the base of the incline. Over time, a slug of liquid is formed, blocking the passage of gas (see (a) in FIG. 1). Gas pressure upstream of the blocking liquid slug increases forcing the forming liquid slug into the inclined section so that a head of liquid ascends through the inclined section ((b) in FIG. 1). The column of liquid creates a hydrostatic pressure which increases as the column lengthens, this hydrostatic pressure being substantially equal to the increasing gas pressure in the conduit upstream of the liquid slug. The length of the liquid slug may become significant and may extend both up the second, inclined portion as well as along the first sloping portion.

Stage II: The upper level of the liquid slug reaches the top of the inclined section and the liquid begins to flow into the separator at the top of a riser or along a third portion of conduit which is coupled to the second portion and which is normally generally horizontal. At this point, the hydrostatic pressure is at a maximum.

Stage III: The increasing gas pressure behind the liquid slug becomes sufficient to overcome the hydrostatic head of the liquid and a gas pocket or bubble is forced into the lower end of the inclined portion of conduit and begins to move up the incline ((c) in FIG. 1). At this stage, there is essentially a fixed gas pressure acting on a diminishing head. The excess of gas pressure over the hydrostatic pressure causes the slug to shoot up the inclined portion at high speed. The gas that has built up behind the liquid slug then discharges to the separator or to the third portion of conduit as a sudden gas surge (gas blow-through) ((d) in FIG. 1).

Stage IV: Once the gas surge has discharged, the multiphase flow once again has insufficient energy to carry the liquid up the inclined section of conduit (as Stage I). The liquid falls down the wall of the inclined section and begins to accumulate at the base of the incline thereby initiating a new cycle.

Hydrodynamic slugging can also occur within a multiphase fluid stream flowing within a conduit, e.g. a substantially horizontal conduit. For instance, where the flow of the two phases is stratified, the relative movement between the gas and liquid layers can create a wave on the liquid layer. If the conditions are right, the wave will grow in size until it fully occupies a cross sectional segment of the conduit. At this point a hydrodynamic slug is formed. If the length of the conduit is several kilometers long, the slug can grow to several hundred meters in length as it passes through the conduit, resulting in a non-uniform liquid hold-up profile due to the formation of large gas bubbles within the fluid, the gas bubbles being interdispersed with liquid bridges of significant size.

Instabilities arising from hydrodynamic slugging are magnified by the dynamics across the riser. As the liquid slug enters the riser, the gain in hydrostatic head associated with the liquid body of the slug will slow down the overall flow of fluid. Similarly, as a proceeding gas bubble enters the riser, the reduction in the hydrostatic head will result in the rapid blowout of liquid within the riser, similar to Stage III in the severe slugging cycle described above. Unlike the case of severe slugging as described above, despite the varying liquid hold-up profile, hydrodynamic slugging does not result in a seizure or interruption in flow that may be regarded as a liquid blockage.

Slugging flow can lead to significant problems, including:

1) Flooding of the inlet gas/liquid separator vessel due to a large "slug" of liquid arriving, the volume of which is more than the available liquid capacity in this vessel. This may lead to emergency shutdowns.

2) Unsteady operating conditions in the downstream equipment. This can lead to failure to meet product specifications; typically failure to meet the regulations for the amount of, oil contaminating the produced water discharge, and failure to meet the specified water content in the export oil, both owing to difficulties in achieving a stable oil/water interface. In addition, this can lead to problems in controlling the gas compressors of the surface production facility owing to the unsteady flow of feed gas to such units from the gas/liquid separators, which may result in some flaring of gas.

3) High stress loads may be imposed on the conduit downstream of the slugging zone owing to liquid slugs travelling at high velocities out of the slugging zone.

The slugging behaviour can also cause pressure shocks through the system, for example in a well. For instance, where the well penetrates a sandstone formation the pressure shock can result in loss of consolidation of the formation rock such that increased sand levels are found in the produced fluid. This in turn can cause erosion of the equipment in the production facility.

The slug of liquid followed by the gas surge can threaten to overwhelm the production facility. The volume of the liquid slug discharged during a blow-out is particularly difficult for the downstream equipment to handle. The gas blow-through is generally detected as a high pressure in the first gas-liquid separator. If the pressure is high enough, a high pressure trip can be initiated by the production facility's safety system, causing safety valves in the system to close so as to shut off the conduit from the production facility. This naturally closes down operation of the facility. This means that production is stopped whilst the effects of the slugging are dealt with and production may not be resumed for at least several hours thereby causing financial loss which can be exacerbated by the possibility of resumed production having to be initially at a low level and then progressively increased to the normal rate.

It is well known that severe slugging can be mitigated by choking (manually closing or partially closing the valve at the top of the riser). This can be understood by considering a system under non-slugging conditions. If a slight increase in liquid hold-up in the riser is introduced, its increased weight will cause the liquid to slow and 'fall back'. This will result in an increase in pressure drop across the riser because (a) upstream pressure increases caused by compression of the liquid falling back and (b) the pressure at the top of the riser falls because of expansion of the gas. The increased pressure drop across the riser will then increase the gas flow rate and push the liquid back up the riser, resulting in more liquid at the top of the riser prior to the perturbation. If the choke valve is open more than a critical value ($Z^{crit}$), too much liquid will leave the system resulting in a negative deviation in liquid hold-up, that is larger than the original positive perturbation. The increase in gas velocity at the base of the riser causes a drop in gas pressure which allows liquid hold-up to grow once again. Thus the system becomes unstable, ultimately resulting in severe slugging. Conversely, for a choke valve open less than $Z^{crit}$, the resulting decrease in liquid hold-up is smaller than the original perturbation and the system is stable and will return to its original non-slugging state.

For this approach to work, a significant amount of choking must be deployed. This means a high back pressure on the wells, undesirably reducing fluid flow rates and thus oil and gas production.

A development of this conventional method is described in WO02/46577. WO02/46557 provides a method which stabilises a multiphase flow through a pipeline and into a riser by measuring pressure or temperature upstream of the point where the main part of the slug is generated. The pressure measurement, or an estimated pressure inferred from the temperature measurement, is supplied to a dynamic feedback controller which calculates an output controlling at least one control valve so as to stabilise the multiphase flow throughout the complete flow line. However, this system is ineffective at adequately mitigating slug formation in many situations and so is unsatisfactory.

More recently, WO2006/120537 discloses methods and systems for automatically controlling a flow in a flow line system including a flow line, a flow line inlet and outlet, and a control valve located in the flow line at the outlet. It is disclosed that the method can include the following steps: controlling the opening of the valve or choke by means of a control unit; measuring or estimating an outlet flow rate or a pressure upstream of the valve or choke, or a pressure difference across the valve or choke, or a fluid density, or a fluid temperature or any combination thereof, and opening of the valve or choke; determining if a sudden drop occurs in any one of the measurements or estimates; deciding if a liquid blockage in the flow line is present or approaching based on the measurements or estimates, and if a liquid blockage is indicated as present or approaching, increasing the opening of the valve or choke by an amount determined by the measurements or estimates; inhibiting any further manipulation of the valve or choke before a non-zero time period has expired; and repeating the aforementioned steps. The methods and systems disclosed in WO2006/120537 rely on discrete logical decision steps and therefore provide discontinuous control. The methods and systems of WO2006/120537 are said to provide better controllability of the flow line than those disclosed in WO02/46557. However, these methods and systems are also ineffective at adequately mitigating slug formation in certain situations.

For instance, one situation in which these known methods and systems are ineffective is hydrodynamic slugging.

Thus, there is still a requirement for an improved method of mitigating slug formation which successfully reduces the extent of slugging of various forms, including severe slugging and/or hydrodynamic slugging.

The present invention has been made with these points in mind.

According to a first aspect of the present invention, there is a method of mitigating slug formation in a multiphase fluid stream that is flowing through a conduit wherein the conduit comprises a first portion and a second portion which is upwardly inclined to the first portion and wherein the multiphase fluid stream comprises a gaseous phase and a liquid phase, the method comprising the steps of:

(a) determining the pressure in the conduit upstream of a slugging zone;
(b) determining the pressure in the conduit downstream of the slugging zone;
(c) determining the actual pressure difference across the slugging zone by subtracting the downstream pressure from step (b) from the upstream pressure from step (a);
(d) optionally, subtracting the frictional pressure drop across the slugging zone to obtain a value for the true hydrostatic head within the slugging zone;
(e) optionally, using the actual pressure difference or the true hydrostatic head to determine the liquid hold-up or mixture density within the slugging zone;
(f) determining the error between a target pressure difference and the actual pressure difference or between a target true hydrostatic head and the actual true hydrostatic head or between a target liquid hold-up and the actual liquid hold-up or between a target mixture density and the actual mixture density;
(g) producing a signal comprising a first component which is proportional to the error and a second component which is proportional to the rate of change of the error over time; and
(h) using the signal produced in step (e) to control the position of an adjustable choke valve located downstream of the slugging zone so as to stabilise variations arising in the actual pressure difference, actual true hydrostatic head, actual liquid hold-up or actual mixture density over time.

Advantageously, it has been found that the method of the present invention may mitigate slug formation due to severe slugging and/or hydrodynamic slugging. Moreover, it is envisaged that the method may mitigate slug formation caused by other slugging phenomena, such as will be familiar to the person skilled in the art.

Typically, step (a) may involve determining the pressure in the conduit upstream of the second portion of the conduit.

Typically, step (b) may involve determining the pressure in the conduit downstream of the second portion of the conduit but upstream of the adjustable choke valve.

Preferably, the frictional pressure drop may be determined using a multi-phase model or, if the flow rate is known or readily determinable, using actual plant data.

The method may comprise determining the error between more than one of: the target and actual pressure difference; the target and actual true hydrostatic head; the target and actual liquid hold-up; and the target and actual mixture density.

According to a second aspect of the invention, there is a system for mitigating slug formation in a multiphase fluid stream that is flowing through a conduit, wherein the conduit comprises a first portion and a second portion which is upwardly inclined to the first portion and wherein the multiphase fluid stream comprises a gaseous phase and a liquid phase, the system comprising:
(i) a first sensor for measuring the pressure in the conduit upstream of a slugging zone;
(ii) a second sensor for measuring the pressure in the conduit downstream of the slugging zone;
(iii) means for determining the actual pressure difference between the upstream and downstream pressure measurements;
(iv) optionally, means for determining the true hydrostatic head within the slugging zone;
(v) optionally, means for determining the liquid hold-up or mixture density within the slugging zone from the actual pressure difference or true hydrostatic head;
(iv) means for determining the error between a target pressure difference and the actual pressure difference or between a target true hydrostatic head and the actual true hydrostatic head or between a target liquid hold-up and the actual liquid hold-up or between a target mixture density and the actual mixture density; and
(v) means for producing a signal comprising a first component which is proportional to the error and a second component which is proportional to the rate of change of the error over time, the signal being usable to control the position of an adjustable choke valve located downstream of the slugging zone so as to stabilise variations arising in the actual pressure difference, actual true hydrostatic head, actual liquid hold-up or actual mixture density over time.

The slugging zone can be regarded as that part of the conduit where the slug builds up. It can extend along the first portion of the conduit several tens of meters from the point at which the first portion of the conduit joins the second portion of conduit and can extend up the second portion of the conduit. In instances of severe slugging, the slug can extend to the top of the second portion. The first and second sensors are preferably located near to the ends of the slugging zone. Although the pressure sensors can be located further away from the slugging zone, the sensitivity of the sensors decreases with increasing distance away from the slugging zone. Where the second portion of the conduit is a riser, the adjustable choke valve is located at the top of the riser. In this case, the second sensor is located at the downstream end of the slugging zone, since it is positioned adjacent the upstream side of the choke valve.

It will be appreciated that where hydrodynamic slugging is concerned, the slug may have formed some distance upstream from the region where the first portion of conduit joins with the second portion of conduit, e.g. in the first portion of conduit some distance from the slugging zone. Hence, in the context of hydrodynamic slugging, the slug may not actually form in the slugging zone, as this term is used in this patent application (i.e. as described in the preceding paragraph). Nevertheless, it will be appreciated that a hydrodynamic slug would still have an effect as it passes through the slugging zone. Accordingly, as will become clear later, the method and apparatus of the present invention may have utility in the mitigation of hydrodynamic slugging phenomena as well as severe slugging.

It has been found that by monitoring the difference between the upstream and downstream pressures (a "differential pressure") and by controlling the position of the choke valve in response to variations in this pressure difference, improved mitigation of slugging behaviour can be achieved. Differential pressure provides an indication of hydrostatic head across the slug; the higher the differential pressure, the greater the size of slug. Also, because the measurement takes into account the pressure at the downstream end of the slugging zone, the measurement also reflects the movement of the slug. Monitoring differential pressure across the slugging zone therefore provides a direct means to detect slug growth and movement.

In contrast, the value of the upstream pressure is related to the pressure drop across the choke valve. Accordingly, the upstream pressure does not directly reflect the nature of the slug or its movement as the effect of the pressure drop across the choke valve masks the upstream pressure changes relating to slug growth. Consequently, responding to variations in the upstream pressure is not as responsive as responding to variations in the pressure drop across the slugging zone.

FIG. 16 shows a schematic flow line comprising an inclined portion (e.g. a riser), downstream of which there is located an adjustable choke valve. The upstream pressure $P_1$, the pressure downstream of the choke valve $P_2$, the pressure downstream of the slugging zone but upstream of the choke valve $P_3$ and the pressure across the choke valve $\Delta P_{valve}$ are indicated in FIG. 16.

In general, the upstream pressure ($P_1$) is made up of the sum of four terms: the pressure downstream of the valve ($P_2$); the hydrostatic head of fluid ($\Delta P_{head}$) in the inclined portion of the conduit; the frictional pressure drop ($\Delta P_{friction}$); and the pressure drop across the choke valve ($\Delta P_{valve}$).

$$P_1 = P_2 + \Delta P_{Valve} + \Delta P_{friction} + \Delta P_{head} \quad \text{equation (1)}$$

In order to ensure flow stability within the conduit (e.g. through a riser) it is generally desired to maintain a constant liquid hold-up profile or mixture density within the slugging zone or the inclined portion of the conduit. By controlling the valve to maintain a constant hold-up profile or mixture density, the liquid flow rates into and out of the slugging zone are matched, thereby delivering stable flow conditions.

Considering an infinitely thin transverse cross section of a conduit carrying a multiphase fluid stream comprising a gaseous phase and a liquid phase, liquid hold-up $\epsilon_L$ is the ratio of the area occupied by liquid phase $A_L$ to the cross-sectional area of the conduit A, i.e.:

$$\epsilon_L = \frac{A_L}{A} \quad \text{equation (2)}$$

It will be appreciated that this is a dimensionless property. The target liquid hold-up may be expressed in this form.

The average liquid hold-up across a length of conduit (e.g. the slugging zone or a riser) can be obtained by integration. The target liquid hold-up may also be expressed in this form for a given conduit.

The density of the multiphase fluid (the mixture density $\rho_{mix}$) may be expressed as:

$$\rho_{mix} = \epsilon_L \rho_L + (1-\epsilon_L)\rho_g \qquad \text{equation (3)}$$

where $\rho_L$ is the density of the liquid phase and $\rho_g$ is the density of the gaseous phase. The target mixture density may be calculated by analyzing the proportion of the two phases within the produced fluid over time.

In an inclined portion of conduit, e.g. a riser, the hydrostatic head $\Delta P_{head}$ may be expressed as:

$$\Delta P_{head} = \rho_{mix} \lg \sin\phi \qquad \text{equation (4)}$$

where l is the length of the portion of conduit, g is the acceleration due to gravity and $\phi$ is the angle of incline. It should be noted that this equation assumes that the portion of conduit is a hypotenuse of a triangle. In reality, typically, the angle of inclination of an inclined portion of conduit such as a riser may vary along its length, e.g. it may be curved, bent or kinked. Accordingly, the mathematics may be slightly more complicated; for instance, it may be necessary to consider a number of shorter sub-sections of the portion of conduit.

In the special case where the portion of conduit is vertical:

$$\Delta P_{head} = \rho_{mix} hg \qquad \text{equation (5)}$$

where h is the difference in height between the top and bottom of the portion of conduit (i.e. l=h and $\sin\phi=1$).

Considering a portion of conduit of known length l and a constant angle of incline $\phi$, it will be appreciated that the only quantities which can vary in either equation 4 or equation 5 are $\Delta P_{head}$ and $\rho_{mix}$. Indeed, $\Delta P_{head}$ is proportional to $\rho_{mix}$.

Therefore, in order to minimize variations in $\Delta P_{head}$, it is necessary to minimize changes in $\rho_{mix}$. Further, it will be appreciated that equation 3 may be substituted into equation 4 or equation 5. Accordingly, slug mitigation can be achieved using mixture density $\rho_{mix}$ or liquid hold-up $\epsilon_L$, as the control variable.

In accordance with the present invention it has been realized that the performance of a slugging control or mitigation method or system is improved by using the pressure drop across the slugging zone (i.e. $P_1 - P_3$). Operating in this manner provides a better indication of the actual liquid hold-up or mixture density within the slugging zone, since the dynamics across the choke valve do not affect the calculations.

Therefore, the upstream pressure ($P_1$) can be expressed according to the following equation:

$$P_1 = P_3 + \Delta P_{friction} + \Delta P_{head} \qquad \text{equation (6)}$$

For instances of severe slugging, the oscillations in the hydrostatic head $\Delta P_{head}$ will be much greater than the other terms in equation 1. Accordingly, as is known in the art, it may be possible to control the slugging by using measurements of just the upstream pressure $P_1$. In accordance with the present invention, however, from equation 6 it will be appreciated that the magnitude of the pressure drop across the slugging zone ($P_1 - P_3$) is made up of the sum of the pressure drops due to friction $\Delta P_{friction}$ and hydrostatic head $\Delta P_{head}$.

In the case of severe slugging, the frictional pressure drop $\Delta P_{friction}$ during the slug generation and production stages (stage I and II respectively) is relatively insignificant and the pressure drop across the slugging zone ($P_1 - P_3$) provides a good approximation of the hydrostatic head within the slugging zone. Similarly, for inclined portions of conduit having a steep angle of incline or a long length, the hydrostatic head will be significantly greater than the frictional pressure drop.

The situation is not quite so simple for a flowing system, where the frictional pressure drop $\Delta P_{friction}$ may account for a relatively significant part of the overall pressure drop ($P_1 - P_3$) and cannot be ignored. For long conduits along which fluid is flowing at a high rate, the frictional pressure drop can account for between 20 and 50% of the total pressure drop across a portion of the conduit. In such instances, the hydrostatic head $\Delta P_{head}$ can no longer be used reliably to provide an indication of the liquid hold-up or mixture density within an inclined section of the conduit.

It will be quickly appreciated that ignoring the frictional pressure drop in such a case could lead to a degraded and ultimately unstable control solution as the frictional pressure drop works in opposition to the hydrostatic head.

For a system that is not friction dominated, an increase in the pressure drop across the portion of conduit is interpreted as a reduction in the overall liquid rate corresponding to the formation and growth of the liquid slug. The response of the controller would be to open the choke valve.

In contrast, for a system that is friction dominated, an increase in the pressure drop corresponds to an increase in flow rate, as the frictional pressure drop is a quadratic function of the flow rate. In essence the behaviour is the opposite of that of a hydrostatic head dominated system.

Conceivably, therefore, an increase in flow rate could be mistakenly attributed to the growth of a slug, resulting in opening of the choke valve. An increase in the position of the choke valve will further raise the flow rate, increasing the frictional pressure drop across the slugging zone. This in turn could be mistakenly identified as the continued growth of the slug, resulting in a further increase in the position of the valve and the flow rate into the separator.

Similarly, a drop in flow rate will result in a reduction in the pressure drop across the conduit. If the frictional pressure drop is not factored into the control solution, then the drop in pressure could be interpreted as the blow-out of the slug resulting in the further closing of the choke valve. This in turn could slow the flow of the fluid, thereby lowering frictional pressure loss $\Delta P_{friction}$. Consequently, the pressure drop across the portion of conduit may fall, potentially resulting in the continued closure of the choke valve.

Hence, it will be appreciated that the system may rapidly become degraded and then unstable, if the frictional pressure drop is not accounted for in the control solution. Accordingly, it may sometimes be preferable to determine the true hydrostatic head (i.e. the measured pressure difference corrected for frictional losses).

In the case of a riser experiencing slugging at relatively high flow rates, the slugging may be hydrodynamic in nature. Hence, the flow arriving at the base of the riser (i.e. where the first portion of conduit joins the second portion of conduit) may comprise a number of large gaseous bubbles inter-dispersed by a number of liquid bridges. As one or more of the gaseous bubbles enter the inclined section of the riser, the hydrostatic head will be lowered across the riser, causing the flow to accelerate. As the flow increases, the frictional pressure drop will also rise. If the gain in friction compensates for the reduction in the hydrostatic head, then there may be no noticeable change in the upstream pressure. Accordingly, methods relying solely on upstream pressure measurements as are known in the art will not be effective in mitigating hydrodynamic slugging.

In contrast, in accordance with the present invention, initially, the reduction in the hydrostatic head can be easily identified by a reduction in the pressure drop across the riser and the response of the controller to close the choke valve will be appropriate. Further, the potentially adverse situation where the controller closes the choke valve too much, resulting in the slowing of the fluid and a further reduction in the pressure drop across the riser can be avoided or mitigated by taking account of the frictional pressure drop.

The frictional pressure drop is a quadratic function of the liquid flow rate and the specific relationship can be determined either from a multi-phase model or, if the flow rate is known or readily determinable, from actual plant data, e.g. the pressure drop across a horizontal section of the conduit. The person skilled in the art will be familiar with other methods of measuring or estimating the flow rate.

FIG. 2 shows (b) the variation in pressure upstream of a slugging zone, (a) the variation in pressure downstream of a slugging zone and (c) the variation in the difference between the upstream and downstream pressures (differential pressure). It can be seen that the trend in pressure difference has a different 'signature' from the upstream pressure trend, the difference corresponding to the fluctuations in the downstream pressure. Not only does the differential pressure profile lead the upstream pressure profile, in this case by about 5 minutes, but the drops and rises in the differential pressure are more rapid and are to a greater extent than the drops and rises in the upstream pressure.

Accordingly, the method and system of the present invention not only react sooner, but also provide a more aggressive control action compared with a system which reacts solely to variations in the upstream pressure. The method and system of the present invention are therefore more responsive than known systems for the mitigation of slugging, including severe slugging.

In more detail, at the point where the upstream pressure is sufficient to overcome the hydrostatic pressure of the liquid slug, the gas phase begins to penetrate into the inclined portion of conduit. As the gas holdup increases in the inclined portion, forcing the liquid up and out of the incline, the hydrostatic head of liquid and liquid hold-up are reduced. The continued lightening of the hydrostatic head of liquid by discharge leads to an acceleration of the remaining liquid out of the inclined portion. During this process, both of the differential pressure and liquid hold-up fall from their peaks to their minima. The method and system of the present invention reacts to move the adjustable choke valve to a more closed position in response to a decreasing differential pressure. Due to the different profiles of the differential pressure and the upstream pressure, movement of the choke valve occurs sooner and more rapidly than is achieved with systems which respond solely to variations in the upstream, pressure. In those systems, the blowout of the slug is initially masked by the increased pressure drop across the choke valve. The more responsive reaction to the slug movement achieved by the present invention allows a more gradual discharge of the slug out of the top of the incline, and also acts to maintain the upstream pressure at an elevated level which lessens the severity of the next slugging cycle.

Similarly, as a slug builds up, the liquid hold-up, as reflected in the differential pressure, increases sooner, more rapidly and to a greater extent compared with the upstream pressure, as can be seen from FIG. 2. The method and system of the present invention moves the choke valve to a more open position in response to an increasing pressure difference. Accordingly, the present invention causes the choke valve to open at an earlier stage in the slug formation process. The resulting reduction in pressure drop across the choke valve can cause the slug to be drawn up the incline. Since the choke valve is opened at an earlier stage in the slug formation process compared with processes which react to the upstream pressure, the slug is smaller and is easier to draw up the incline.

By acting sooner in the slugging cycle, the method and system of the present invention can control slugging with a lower level of choking of the choke valve, i.e. the average position of the choke valve can be more open, compared with systems which control the choke valve position in response to the upstream pressure. This advantageously allows a higher liquid and gas production rate from the well.

Further, because the amplitude of variations in the differential pressure is greater than the amplitude of variations in the upstream pressure, as can be seen from FIG. 3 (discussed in more detail below), the differential pressure profile provides a more identifiable signal compared with the upstream pressure profile, even after the system of the present invention has been activated to mitigate slugging.

In the case of hydrodynamic slugging, as a gas bubble passes up the second portion of conduit, there will be an associated reduction in the actual pressure difference. This reduction in the pressure difference is primarily due to a reduction in the hydrostatic head within the second portion of conduit. Hence, the choke valve will be adjusted to a more closed position, in order to counteract the reduction in hydrostatic head. Once the bubble has passed through the valve, there may be an increase in the hydrostatic head (indicated by an increase in the measured pressure difference). In response to this increase in the measured pressure difference, the choke valve will be adjusted to a more open position, in order to encourage the flow of the liquid bridge following the bubble and to maintain a substantially constant liquid hold-up profile within the second portion of conduit.

By monitoring the liquid hold-up or mixture density within the second portion of the conduit (inclined) and controlling the position of the choke valve in response to variations in this liquid hold-up or mixture density, improved mitigation of slugging behaviour can be achieved. For severe slugging, it has been found that the higher the liquid hold-up within the second portion of the conduit, the greater will be the size of slug. Also, because the measurement takes into account the pressure at the end of the slugging zone, the measurement also reflects the movement of the slug. Monitoring the liquid hold-up through the differential pressure across the slugging zone therefore provides a direct means to detect slug growth and movement.

Advantageously, the methods and systems of the present invention may reduce or minimize variations in the measured differential pressure or liquid hold-up. Hence, in circumstances where the measured differential pressure may be taken to be a reasonable approximation of changes in hydrostatic head pressure (e.g. severe slugging), it will be appreciated that the method and system of the present invention beneficially minimize or reduce variations in the hydrostatic head pressure. Indeed, ideally, the method and system of the present invention may be operable to ensure that the hydrostatic head pressure is maintained at a substantially constant level.

During operation, the upstream and downstream pressures can be determined continuously so as to continuously produce the signal. Accordingly, the present invention may provide a continuous control solution for the mitigation of slugging.

The first portion of conduit tends to be generally horizontal or slightly downwardly sloping towards the second portion.

FIG. 11 is a generalised graph (a bifurcation curve) showing the variation in pressure upstream of the slugging zone on the y-axis and the extent of opening of the choke valve on the x-axis. The graph may be sub-divided into three regions (I, II, III). The first region (I) corresponds to a stable non-oscillatory flow regime at low valve opening, in which pressure falls as the valve opening increases. The second region (II, delineated by vertical dashed lines) and third region (III) together correspond with an unstable non-oscillatory flow regime. Accordingly, slugging flow may occur under this regime. In slugging flow, as shown in FIG. 11, the pressure may vary between a maximum ($P_{max}$) and a minimum ($P_{min}$). The difference between for $P_{max}$ and $P_{min}$ may be termed the slugging amplitude. In the third region (III), the values for $P_{max}$ and $P_{min}$ do not vary substantially with changes in the valve opening. The difference between $P_{max}$ and $P_{min}$ is relatively constant across the whole of the third region (III). In the second region (II), however, the difference between $P_{max}$ and $P_{min}$ varies as the values of $P_{max}$ and $P_{min}$ diverge as the valve opening increases. Accordingly, it will be appreciated that effective and efficient control can be achieved by operating the choke valve within the second region (II) since, in the second region (II), relatively small changes in valve opening will have a much more noticeable effect. In contrast, basically no control can be achieved by operating the choke valve within the third region (III), since, in the third region (III), moving the choke valve position will have essentially no effect on slugging amplitude.

The invention may include a controller to produce the signal used to control the position of the adjustable choke valve. A proportional-integral-derivative (PID) controller has been found to be suitable. The output of a parallel form of PID controller can be described as:

$$\text{output} = k_p \left( e(t) + k_i \cdot \int_0^t e(\tau)\, d\tau + k_d \cdot \frac{de(t)}{dt} \right) \quad \text{equation (7)}$$

where $k_p$ is the proportional coefficient and can be from $-\infty$ to $\infty$;

e(t) is the error between the target pressure difference (set point of the controller) and the actual pressure difference at a given time and is calculated by subtracting the actual pressure difference from the target pressure difference;

$k_i$ is the integral coefficient and can be from 0 to $\infty$;

$e(\tau)$ is the error at a time $\tau$, prior to time t.

$k_d$ is the derivative coefficient and can be from 0 to $\infty$; and t is time.

Other suitable forms of PID controller, such as a series PID controller, will be well known to the skilled person.

PID controllers are commonly used in control systems and are available commercially, for example from Honeywell or Emerson. However, particularly successful slug mitigation has been achieved when the integral coefficient of the PID controller is set to 0. The controller effectively then operates as a proportional-derivative (PD) controller only, as there is no integral action.

Including derivative action in a control system is relatively uncommon because it can cause excessive variation in the output signal when the measurement signal is noisy. However, it has been found that the fluid systems in which the present invention is used can be viewed as 'open-loop' unstable and that proportional and derivative action only (i.e. no integral action) can provide superior closed loop response to that given by proportional action only or proportional and integral action only.

Using proportional and derivative action only allows the present invention to have increased sensitivity and to react more quickly than when proportional action only or proportional plus integral action are used. The derivative action introduces an anticipatory action, acting to quickly stabilise the fluid system.

The integral part of a PID controller introduces a feedback lag, more specifically a lag into the closed loop, which has been found to degrade control performance.

The value for the set point (which may be the target pressure difference or target true hydrostatic head or target liquid hold-up or target mixture density) of the controller can affect the extent (amplitude) of slugging experienced. An increase in the set point causes the average choke valve position to be more closed, which slows flow of liquid from the riser, which in turn stifles slug formation. However, this is at the cost of reducing the production rate. Conversely, reducing the set point causes the average choke valve position to be more open to achieve a reduction in the average upstream pressure. However, this can reduce the level of stability of the fluid system.

The set point may be set manually, for example by an operator, so as to reduce the extent of the slugging to a satisfactory level. Although a high set point may mitigate slugging behaviour effectively, the production rate is reduced significantly because the average choke valve position is relatively more closed. Accordingly, the set point is preferably chosen to sufficiently mitigate slugging, thereby reducing its associated disturbance to the facility to a tolerable level, whilst minimising the subsequent reduction in fluid flow out of the conduit. The operator selects the set point based on the previous behaviour of the fluid system. It will be apparent to the operator from an analysis of the pressures upstream and downstream of the slugging zone, and therefore of the pressure difference and/or of the liquid hold-up, over a period of time during normal operation, how low the target pressure difference or liquid hold-up can be to sufficiently mitigate slugging.

However, it has been found that the behaviour of the fluid system and therefore the average upstream pressure can vary over time. It has therefore been found desirable to vary the set point of the controller over time. By varying the set point of the PD controller, e.g. the target pressure difference, the average upstream pressure can be controlled.

The set point can be varied manually over time, by an operator, though this can be time consuming. However, in a particularly advantageous embodiment, the invention may include a master controller for automatically setting the set point of the PD controller, which can then be viewed as a slave controller. In this way, the invention automatically varies the slave controller's set point so as to control the upstream pressure to a desired level. This automatic adjustment of the slave controller's set point by the master controller is both accurate and requires little human intervention.

The process dynamics of the master loop are much slower than those of the slave loop. Accordingly, the master controller operates to provide slow manipulation of the slave controller's set point. This can be achieved by providing the master controller with proportional plus integral (PI) action, whereby the pressure upstream of the slugging zone is an input.

Suitably, the controller is a PID controller as discussed above, wherein the derivative coefficient is set to 0. Accordingly, an error between a master controller set point and the pressure upstream of the slugging zone is determined and the output signal of the master controller comprises a component which is proportional to the master controller error and a component which is proportional to the error integrated over a period of time. The PI master controller can have a low proportional action and a long integral time (in the order of many hours). The master controller's set point is the desired upstream pressure and is set by the operator in response to observations of the pressure upstream of the slugging zone prior to commencing operation of the invention.

Although the set point of the PD slave controller can be selected manually, as above, to achieve successful slugging mitigation, when a master controller is used to automatically set the set point of the PD slave controller, the invention achieves continuous control of both slugging mitigation and production rate with accuracy and with less human intervention.

In preferred embodiments of the invention, limiting means are provided to limit the range over which the controller can adjust the choke valve position. The position of the adjustable choke valve can be limited within lower and upper limits which can be equally spaced above and below the normal average operating position of the choke valve. For example, the lower and upper limits can be up to 30%, up to 20% or optionally up to 10% below and above the normal average operating position of the choke valve respectively.

Although allowing the adjustable choke valve to move freely without being subjected to limits, under the control of the invention, can completely eliminate slugging behaviour, such heavy usage of an adjustable choke valve increases wear and tear on the valve, which is undesirable. It has been found that slug formation can be mitigated adequately even if the opening/closing of the choke valve is constrained within certain limits, and this also reduces the extent of wear and tear on the valve. Hence, it may be desirable to select limits that would cause the invention to operate in an efficient manner in which movement (and hence wear and tear) of the valve would be minimized or reduced, e.g. as in the second region (II) of the graph of FIG. 11.

Over time, the downhole pressure in a well or subterranean reservoir feeding a conduit or pipeline in which slugging may occur may vary, e.g. it may fall as the reservoir becomes depleted. As a consequence, the controller may want to move the average position of the valve to be more closed or open, in order to maintain the desired pressure difference across the slugging zone and hence control the amplitude of slugging.

The limits may be adjusted to allow for this variation. The limits may be adjusted manually by the operator or automatically.

The person skilled in the art will be familiar with various ways of automatically adjusting limits to suit operating conditions. Limits that are adjusted automatically to suit operating conditions may be known as dynamic constraint limits.

A preferred method of implementing dynamic constraint limits in the present invention involves calculating a rolling average of the output signal of the controller. This rolling average is then processed using a pair of algebraic calculation blocks, one of which defines a desired negative band and the other of which defines a desired positive band, i.e. acceptable bands either side of the normal average position of the choke valve, to determine the higher and lower constraint limits. While the operator may set the desired bands, the absolute values of the limits are determined automatically.

In preferred embodiments, a filter may be provided to filter out noise emanating from the determination of the pressures upstream and downstream of the slugging zone. For instance, a low pass filter may filter out high frequency noise. Hence, the noise may be superimposed on the determination of the pressure difference across the slugging zone. Advantageously, filtering the noise may prevent, mitigate or reduce any undesirable amplification of the noise on to the choke valve due to the derivative action of the controller.

Moreover, the provision of a filter gives an engineer an additional means for tuning the controller. For instance, the filter may permit better regulation of the speed of movement of the choke valve. It may also remove or lessen any need to reduce derivative action within the controller.

The present invention will now be described, by way of example only, with reference to the accompanying drawings, in which:

FIG. 9 is a schematic of a second embodiment of the invention;

FIG. 10 is a schematic of a third embodiment of the invention;

FIG. 11 is a graph showing a bifurcation curve and is discussed above;

Figure 1A:
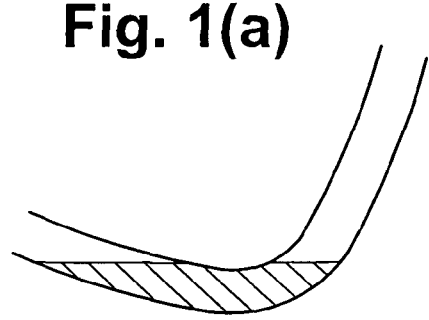
FIG. 1 shows the stages of slug formation.
Figure 1B:
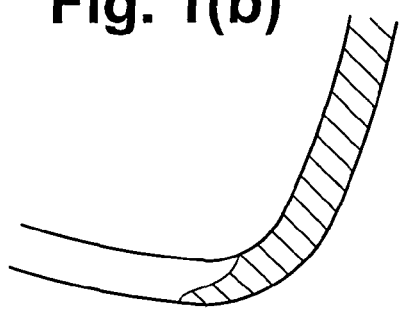
Figure 1C:
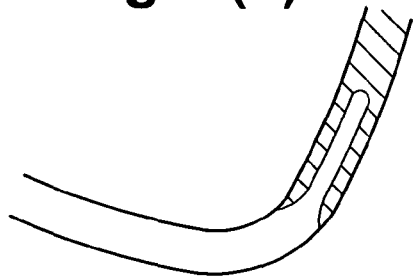
Figure 1D:
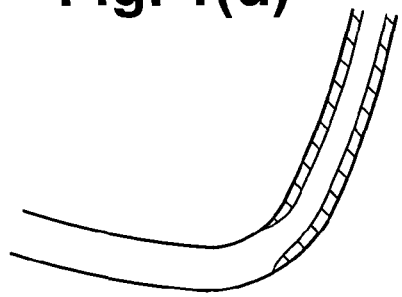
Figure 4:
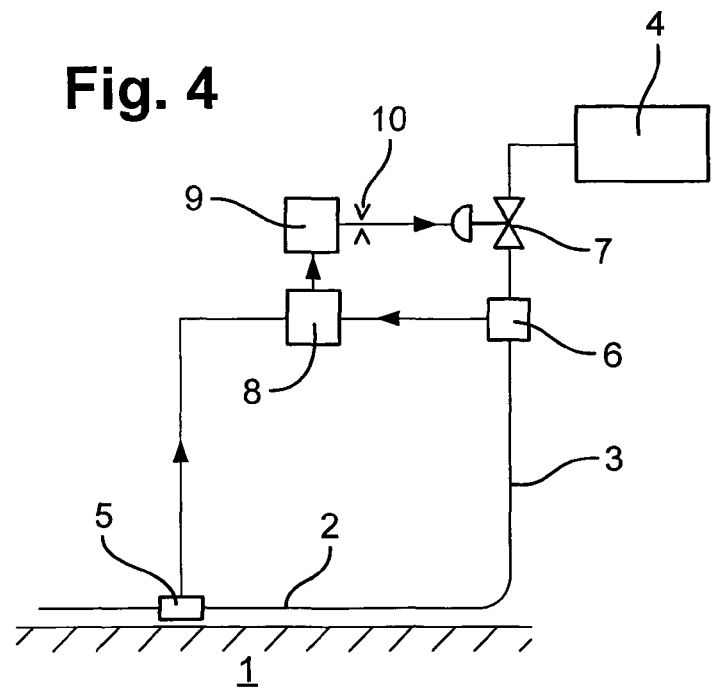
FIG. 4 is a schematic of a first embodiment of the invention.
Figure 2:
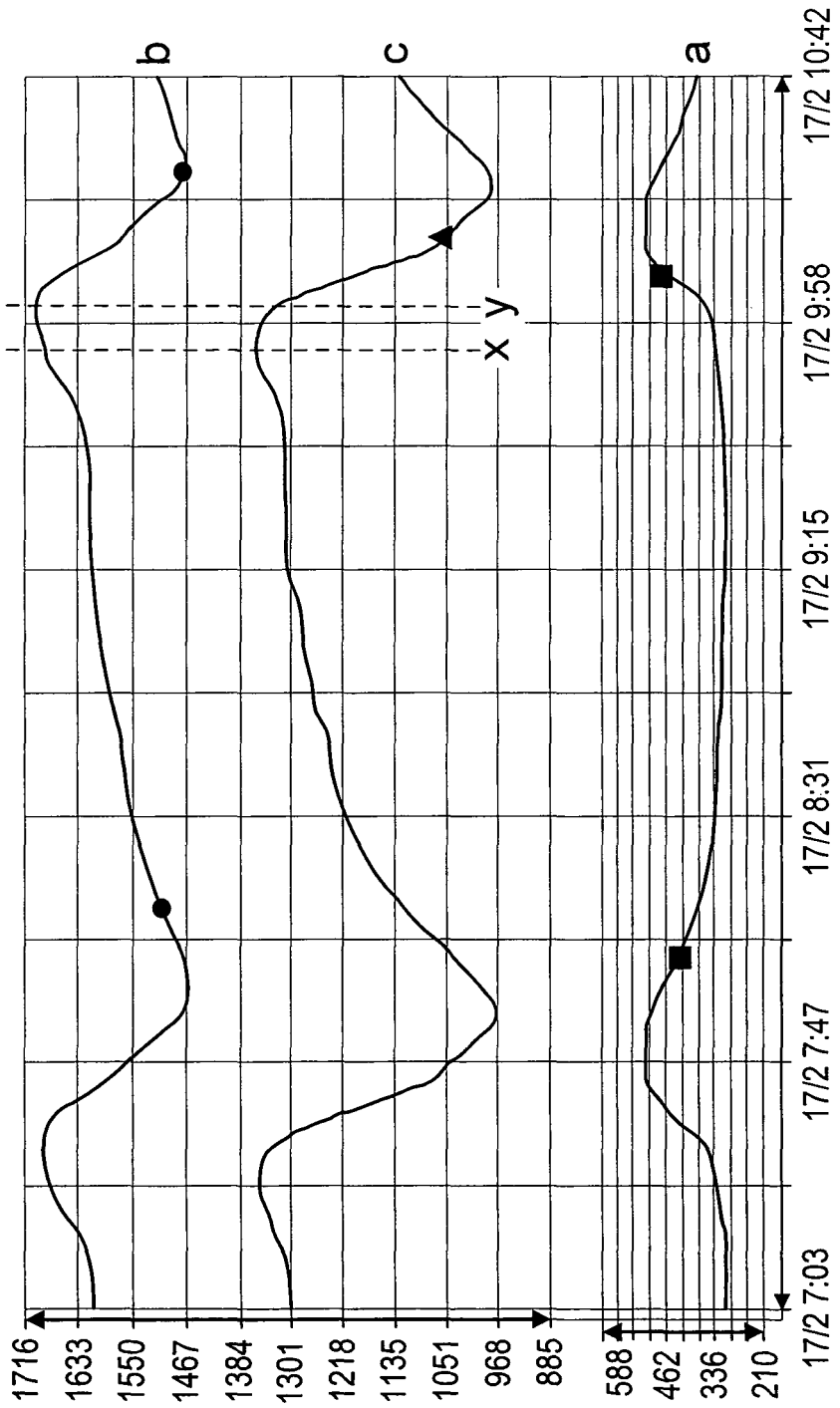
FIG. 2 shows typical variations in the upstream, downstream and differential pressures over time, and is discussed above.

FIG. 4 shows an example of how the present invention can be used to mitigate slugging behaviour in a flowline and riser situation. A pipeline 2 extends along a sea bed 1 and is connected to a riser 3 extending to a production facility 4 above the surface. Slugs develop (in the case of severe slugging) where the pipeline 2 meets the riser 3. Conventionally, an operator will be provided with information acquired from pressure sensors (not shown) arranged along the pipeline 2 which will indicate to the operator what length of the pipeline is affected by the slugging i.e. the extent of the slugging zone.

According to the present invention, a first pressure sensor 5 is located on the pipeline 2 upstream of the slugging zone and a second pressure sensor 6 is located at the downstream end of the slugging zone on the riser 3 immediately upstream of an adjustable choke valve 7 at the top of the riser. There may be a small gap between the second pressure sensor 6 and the adjustable choke valve 7.

The first 5 and second 6 pressure sensors continuously measure the pressure in the conduit (i.e. pipeline and riser) upstream and downstream of the slugging zone respectively.

Suitable types of pressure sensors 5,6 are widely available and known to the person skilled in the art. Similarly, suitable adjustable choke valves 7 are available commercially. Typically, an adjustable choke valve comprises adjustable flow restriction and actuator elements. Closing of the choke valve refers to instructing the actuator to close the flow restriction element to decrease the flow path through the valve, while opening of the choke valve refers to instructing the actuator to open the flow restriction, thereby increasing the flow path through the valve. The adjustable choke valve is typically partially open, and normally would be fully closed only during a planned production outage or an emergency shutdown.

The output signal of each pressure sensor 5,6 is fed to processing means 8 which calculates the actual pressure difference between the upstream and downstream pressures. The processing means can be a computer or other control system.

The pressure difference calculated by the processing means 8 is passed to a PID controller 9 which operates in line with equation (1) above. The integral coefficient is set to zero such that the controller 9 operates as a proportional-derivative controller only. The proportional and derivative coefficients are tuned by an installation engineer according to well known tuning techniques, involving modelling or using commercially available software tuning packages.

The local operator pre-programs the PD controller 9 with a set point (i.e. a target pressure difference). Selection of the set point is made based on observations of the current slugging behaviour in the pipeline/riser system. The operator reviews the variations in differential pressure over the recent past and assesses the average differential pressure for that period and selects that average value as the PD controller's set point.

The PD controller 9 determines the error between the actual pressure difference and the set point, and then calculates an output according to equation (1) above, using the values for the set point, proportional coefficient and derivative coefficient programmed into the PD controller.

The result of the PD controller's calculation is then outputted to limiting means 10. Some PID controllers include built-in limiters; others do not, in which case a separate limiting functional block 10 can be included in the control system, as seen in FIG. 4. The limiting functional block can be part of a computer, for example.

The limiting means 10 has been pre-programmed by the engineer with a lower limit and an upper limit. The engineer makes observations on the slugging cycle over the recent past so as to assess the normal average operating position of the choke valve. The engineer then assesses the level of slugging and the amount of slugging that can be tolerated, and then sets the breadth of the upper and lower limits above and below the normal average operating position. For example, the upper and lower limits may be set at 20% above and below the normal average operating position respectively.

If the result of the PD controller's calculation is less than the lower limit, the output signal of the limiting means is equal to the lower limit. If the result of the calculation is between the lower limit and the upper limit, the output signal of the limiting means equals the result of the calculation. If the result of the calculation exceeds the upper limit, the output signal of the limiting means is equal to the upper limit.

Figure 5A:
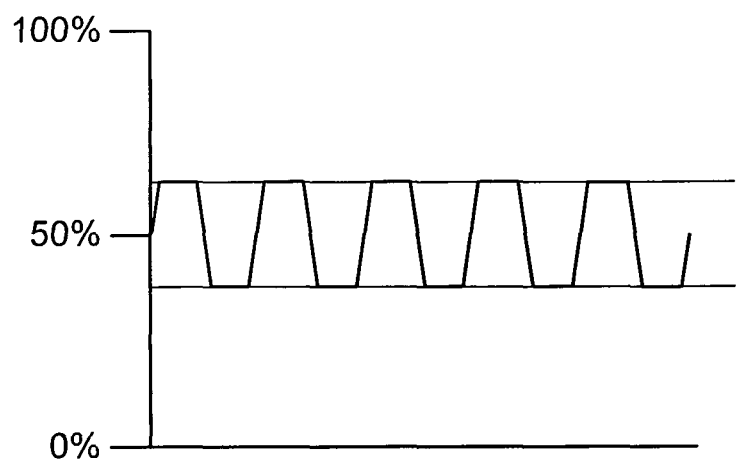
FIGS. 5a and 5b show examples of the movement of the adjustable choke valve.
Figure 5B:
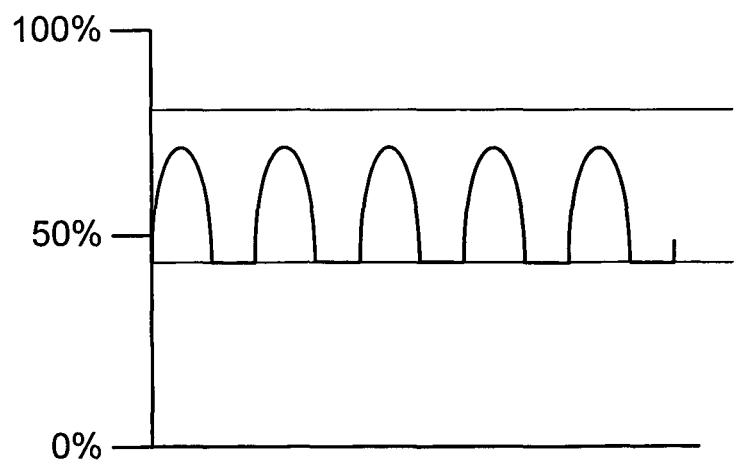

Since the actual position of the choke valve 7 is controlled by the PD controller 9, the aim is to set the limits such that the position of the choke valve oscillates over time evenly within the limits, spending roughly the same length of time at the lower limit as at the upper limit. An example of this can be seen in FIG. 5a, where the choke valve position is shown on the x-axis as a percentage open and time is shown on the y-axis. It can be seen that the limits are evenly spaced above and below the average choke valve position. Naturally, the choke valve position may oscillate evenly within the limits without ever reaching the limits. If the limits are found to be inappropriate, the variation in choke valve position will be offset from the mid-point of the two limits and, if one or both of the limits are reached, more time would be spent at one limit than at the other as seen in FIG. 5b. In FIG. 5b, the normal average choke valve position is assessed as being higher than appropriate. Consequently, the limits are set too high and the choke valve spends time at the lower limit but does not reach the upper limit. This can be rectified easily simply by adjusting the limits appropriately.

Alternatively, the slugging control system can be operated for one, two or more slugging cycles without imposing limits on the result of the PD controller's calculation, so as to determine with increased certainty the normal average choke valve position. The lower and upper limits can then be set equally below and above that average position respectively.

Figure 3:
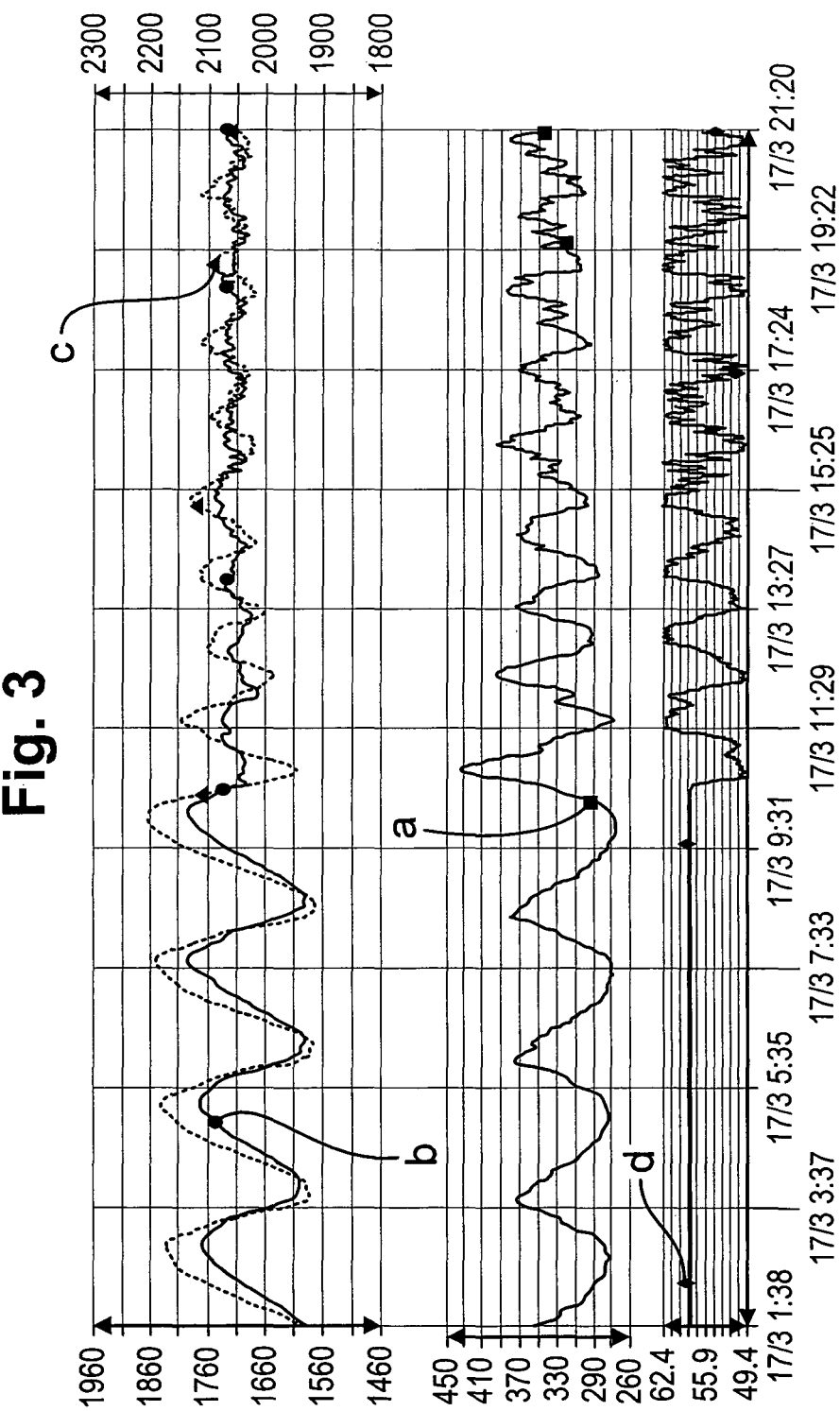
FIG. 3 shows the variations in conduit pressures and choke valve position before and after the method of the invention is implemented.

FIG. 3 shows the upstream pressure (b), the downstream pressure (a), the differential pressure (c) (i.e. the downstream pressure subtracted from the upstream pressure) and the choke valve position (d) of a typical slugging system before and after implementation of the method of the present invention (indicated by commencing active control of the choke valve position). The top vertical axis on the left hand side shows the pressure for the upstream and downstream pressures. The bottom vertical axis on the left hand side shows the choke valve position and the vertical axis on the top right hand side shows the value of the differential pressure (the scales are the same). Accordingly, the upstream pressure and differential pressure curves have been superimposed for ease of comparison.

It can be seen that the differential pressure curve has a greater amplitude than the upstream pressure curve, both before and after implementation of the invention, thereby providing an improved indication of slug formation and movement compared with systems which control the valve position in response to the varying upstream pressure.

In FIG. 3, the method of the invention is implemented as the differential pressure approaches its minimum i.e. as the slug is being discharged. The control action causes the choke valve to be moved to a more closed position (line d), slowing the discharge of the liquid. The differential pressure begins to increase again, corresponding to the build up of a slug at the bottom of the inclined portion of conduit. As the pressure difference rises, the error between the actual pressure difference and the target pressure difference increases. Also at this time, the rate of change of the error is increasing. Consequently, both the proportional component and the derivative component of the PD controller's calculation increase, causing the valve to be moved to a more open position as can be seen on line (d) of FIG. 3. This results in a reduced pressure drop across the choke valve, thus helping lift the slug up the riser.

As the pressure difference peaks and then begins to drop, i.e. as the slug reaches the top of the incline and begins to discharge, the derivative component turns from positive to negative and so begins to reduce the output signal of the PD controller. Also, as the pressure difference decreases, so too does the proportional component which also causes a reduction in the output signal of the PD controller. Accordingly, the choke valve is moved to a more closed position, as seen on line (d) of FIG. 3.

If the output signal of the PD controller reaches the upper and/or lower limits, the choke valve is simply opened/closed to the permissible extent, attenuating the slugging behaviour to a satisfactory level, though perhaps not completely.

The position of the choke valve is controlled according to the present invention in real time in response to variations in the differential pressure. As with any computational system, there is some computational delay. However, the delay is so small, particularly relative to the frequency of the slugging cycle, that it may be ignored.

Figure 6:
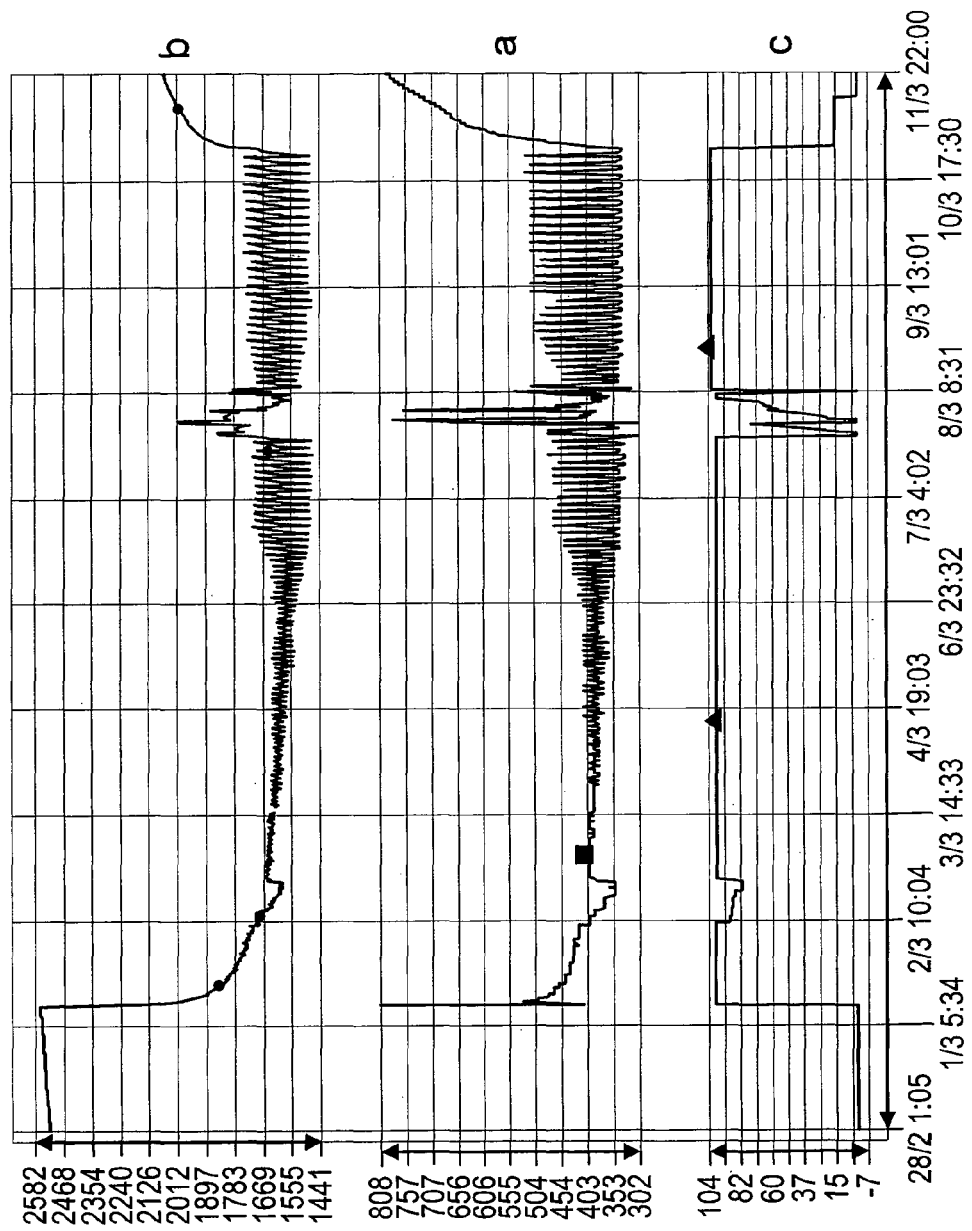
FIG. 6 shows measurements taken from slugging well (A)

The characteristics of a known slugging well (well (A)) are shown in FIG. 6. The well suffers from severe slugging and so frequently has to be shut in to allow the upstream pressure to recover. Line (b) of FIG. 6 shows a gradual increase in the upstream pressure over time whilst the well is shut in and the choke valve is fully closed. Once the bottom hole pressure (equivalent to upstream pressure for well-based slugging such as is being described in this example) has built up, the choke valve (Line (b)) is opened to recommence production. At this point, the bottom hole pressure decreases rapidly. At this point the downstream pressure, line (a) drops also. Pressures then begin to oscillate as slugging develops due to the reduced bottom hole pressure. After a period of time, slugging becomes too severe and the well is shut in again, as shown by line (c), choke valve position.

Figure 7:
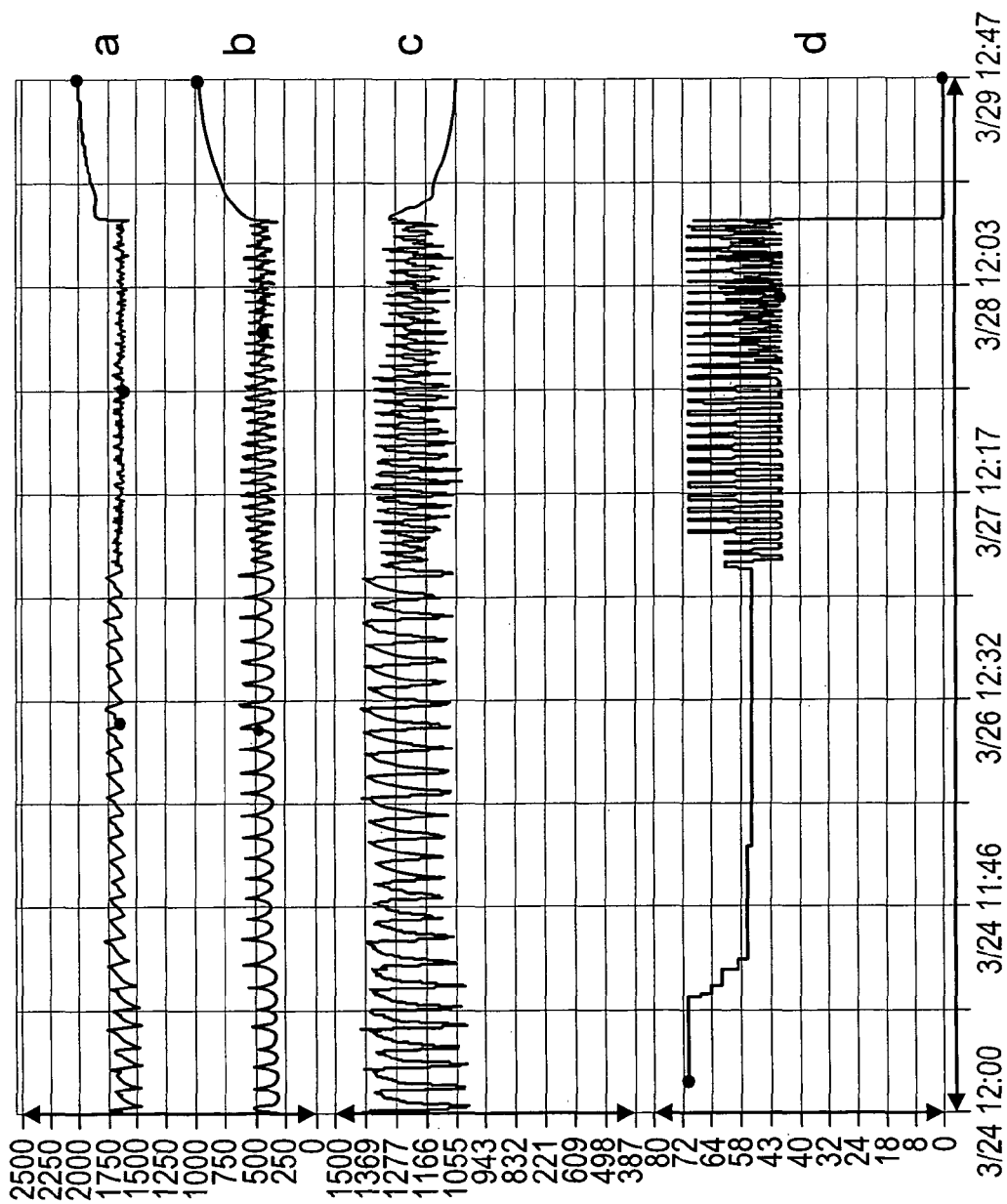
FIG. 7 shows measurements taken from slugging well (A) when the first embodiment of the present invention is used on the well in a first trial.

FIG. 7 shows the effect of carrying out the method of the present invention on well (A) in a first trial. The pressure upstream of the slugging zone is shown in line (a); the pressure downstream of the slugging zone is shown in line (b); the differential pressure is shown in line (c); and the position of the choke valve is shown in line (d).

The system was operated for a first period of time according to the conventional practise described above in connection with FIG. 6. However, rather than allow the slugging to worsen to the point where the well has to be shut in, the control of the choke valve was passed over to the method and apparatus of the invention for a second period of time, lasting two days.

During the second period of time, the position of the choke valve is dynamically controlled by the output from the apparatus of the present invention. The limiting means ensures that the position of the choke valve does not decrease below 45% open and does not exceed 70% open. It can be seen that the extent of slugging decreases during the second period of time, as evidenced by reductions in the amplitude of the upstream pressure and the differential pressure graphs.

Figure 8:
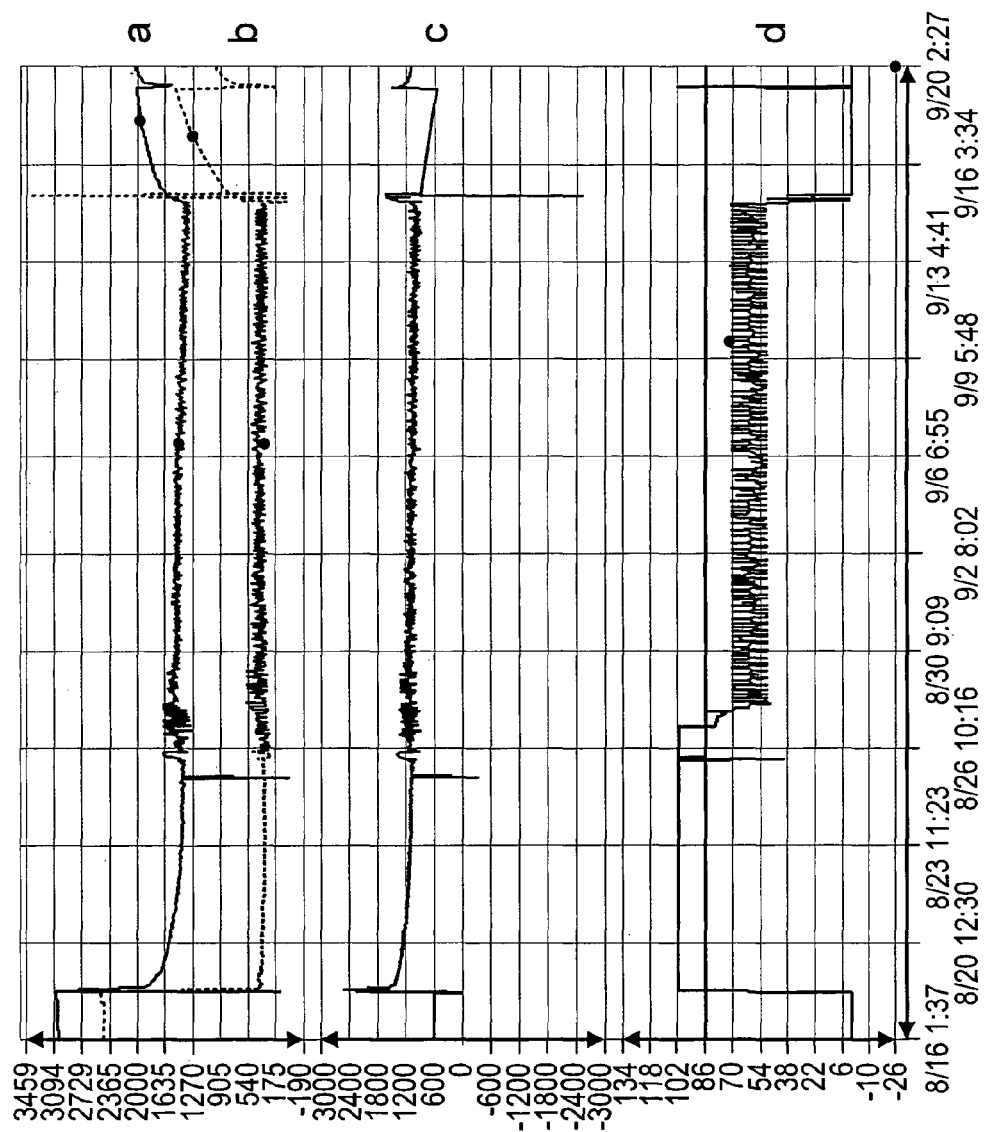
FIG. 8 shows measurements taken from slugging well (A) in a second trial.

FIG. 8 shows the results of a second, similar trial, conducted on the same well, for a period of 23 days. The only other difference was that the limiting means was set to ensure that the position of the choke valve did not decrease below 50% and did not exceed 70%. As in FIG. 7, line (a) is the upstream pressure, (c) is the downstream pressure, (b) is the differential pressure and (d) is the choke valve position. Once again, the slugging behaviour was mitigated after the apparatus of the present invention was turned on. However, it can be seen that the upstream pressure swings over a wider range during the second period of time than shown in FIG. 7. This is because the more restricted movement of the choke valve does not mitigate the slugging to the same extent as was achieved in the first trial shown in FIG. 7.

It can be seen in FIG. 8 that, for this particular well, the average upstream pressure decreases slightly over the course of the trial.

FIG. 9 shows a second embodiment of the present invention. The second embodiment is similar to the first embodiment shown in FIG. 4, with the addition of a master controller 17 which is provided to automatically set the set point of the PD controller 9. Like reference numerals refer to like components. The PD controller 9 can be considered as a slave controller in this embodiment. The master controller 17 is also a PID controller. However, the derivative coefficient is set to zero such that the controller 17 acts as a proportional-integral (PI) controller only. The input to the master, PI controller 17 is the pressure measurement from the first pressure sensor 5 located upstream of the slugging portion of pipeline. The PI controller 17 has proportional and integral coefficients, which are pre-programmed by an installation engineer in the same way as described above with respect to tuning the PD controller 9 of the first embodiment. The proportional coefficient (controller gain) is selected to be relatively low and the integral coefficient (time) is selected to be relatively long, such as several hours per repeat. In this way, the output signal of the master, PI controller 17 varies only slowly, therefore slowly varying the set point of the slave, PD controller 9. The PI controller 17 has a set point which is pre-programmed by an engineer based on his observations of the upstream pressure over time.

The slow variation in the set point of the slave PD controller 9, caused by the master controller 17, can maintain a constant upstream pressure over time, thereby avoiding variations in the upstream pressure such as the gradual decrease seen in the second trial above.

FIG. 10 shows a further example of the invention, in which the method of the invention is used to mitigate slugging in a conduit laid along the ground 11 to carry fluid from one point on the surface to another, whereby the conduit must rise up and over an impediment, such as a geological formation, for example a ridge. A first portion 12 of conduit runs along the ground. A second portion 13 of conduit, coupled to the first portion, is inclined to the first portion so as to rise up and over a ridge 14. The second portion 13 is in turn coupled to further portions 15 of conduit which carry on the conduit to its destination 16.

Slugging arises in this situation for the same reasons as situations involving subsea pipelines connected to risers. Accordingly, features of the invention discussed in connection with this example are applicable to the second embodiment described above, and vice versa. In fact, unless otherwise stated, the invention according to this example has the same construction and operates in the same way as the second embodiment shown in FIG. 9, and so like reference numerals refer to like components.

Figure 12:
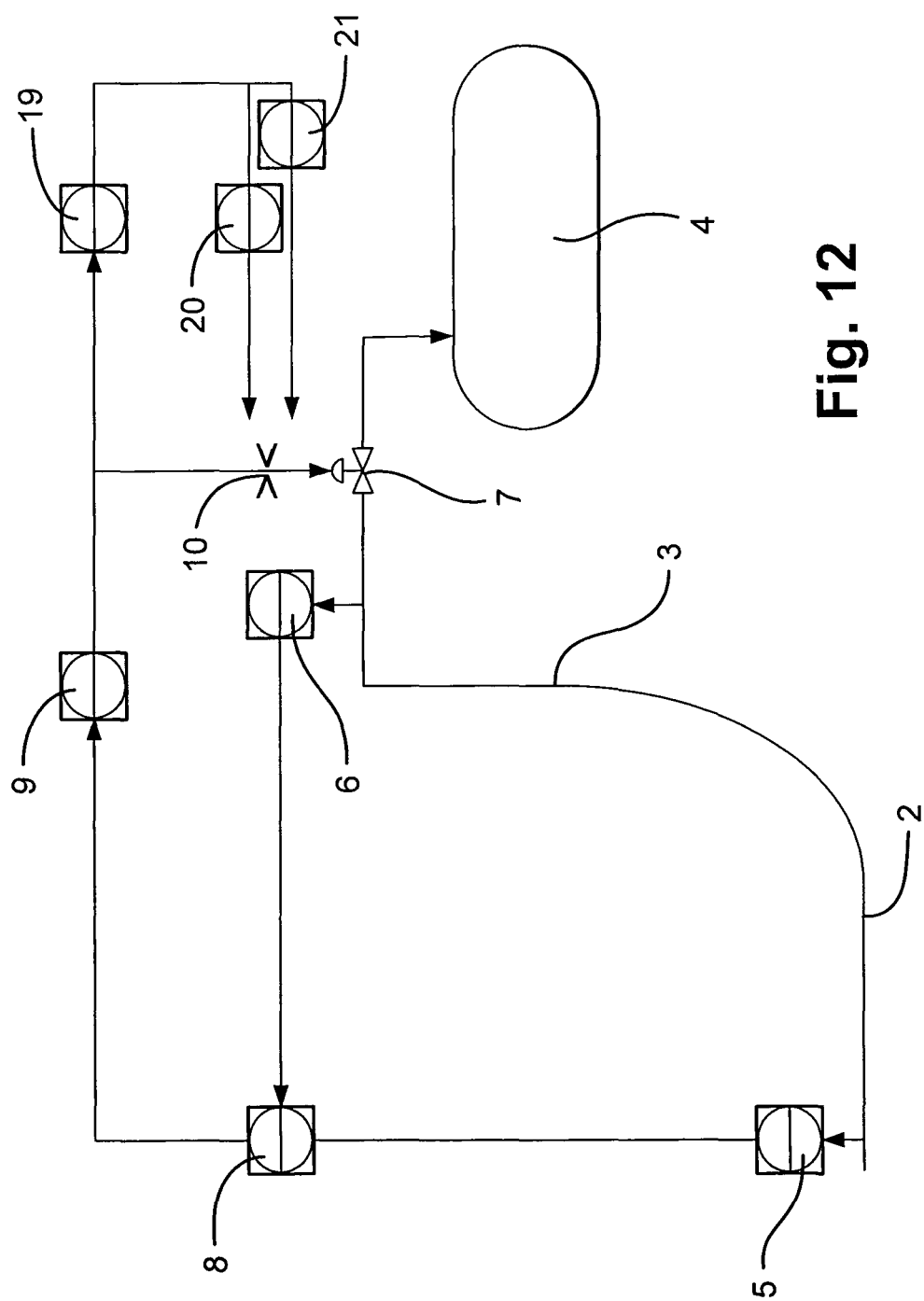
FIG. 12 is a schematic of a fourth embodiment of the invention.

FIG. 12 shows a further example of the invention. The invention according to this example has many common features with the embodiment shown in FIG. 4, and so like reference numerals refer to like components. In addition to the arrangement shown in FIG. 4, the example of FIG. 12 further comprises means for calculating a rolling average 19 and first 20 and second 21 algebraic calculation blocks to provide dynamic constraint control of the limiting means 10.

In this embodiment, the means for calculating a rolling average 19 calculates a rolling average, using a sufficient number of historical terms as determined by the engineer, of the output signal of controller 9. The rolling average is then processed by first 20 and second 21 algebraic calculation blocks. The first algebraic calculation block 20 defines a desired negative band, i.e. an acceptable band below the normal average position of choke valve 7, thereby determining the lower constraint limit. The second algebraic calculation block 21 defines a desired positive band, i.e. an acceptable band above the normal average position of choke valve 7, thereby determining the upper constraint limit. Thus, it will be appreciated that the absolute values of the limits are determined automatically.

Figure 13:
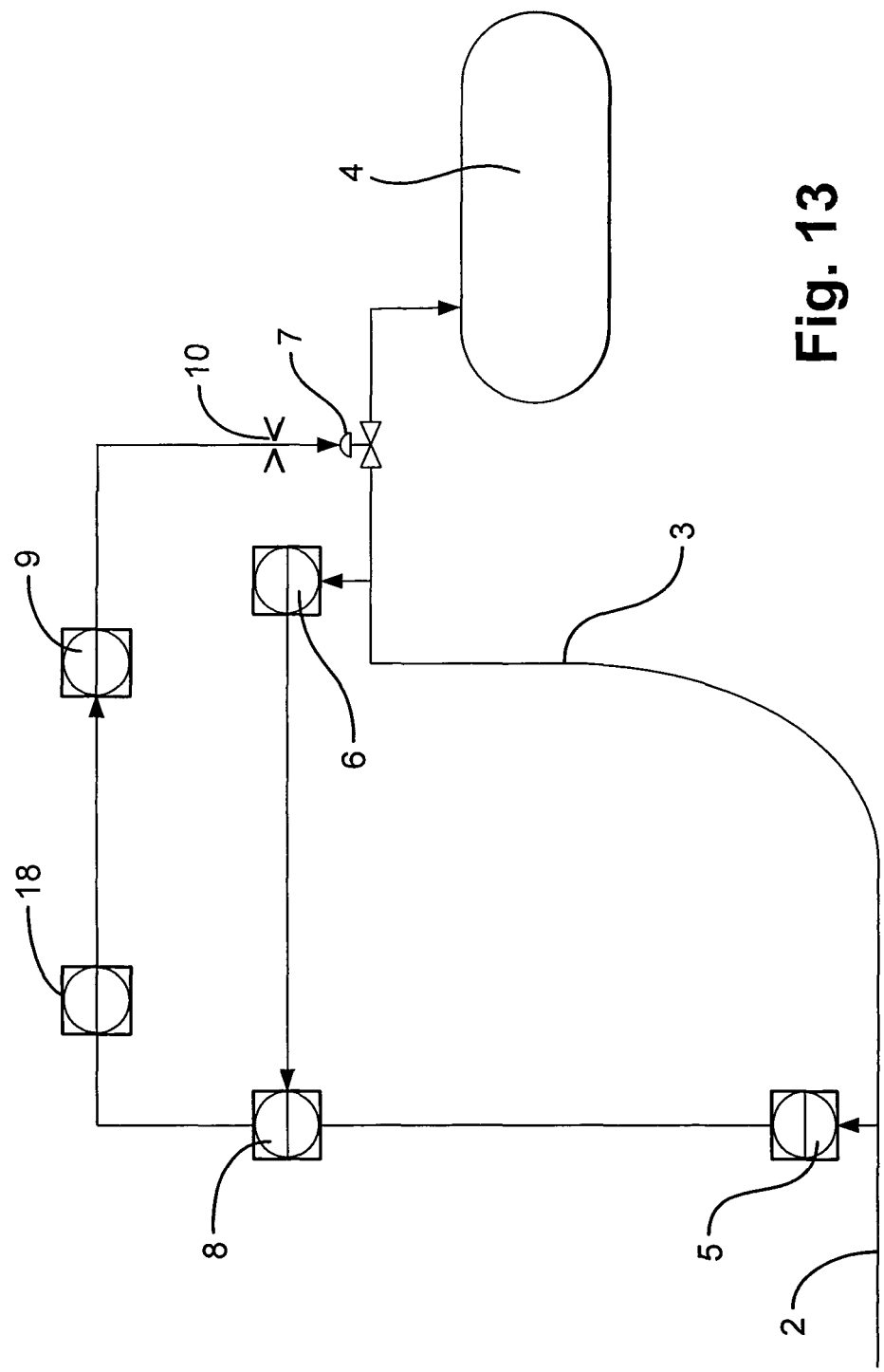
FIG. 13 is a schematic of a fifth embodiment of the invention.

FIG. 13 shows a further example of the invention. The invention according to this example has many common features with the embodiment shown in FIG. 4, and so like reference numerals refer to like components. The example of FIG. 13 augments the arrangement shown in FIG. 4 by the inclusion of a low pass filter 18 located between the processing means 8 and the controller 9.

It should be appreciated that the examples of FIGS. 12 and 13 may be combined, i.e. a system according to the invention may comprise dynamic constraint control and a low pass filter. Further, one or more of dynamic constraint control and/or a low pass filter may be applied to the embodiments of the invention shown in FIGS. 9 and 10.

Figure 17:
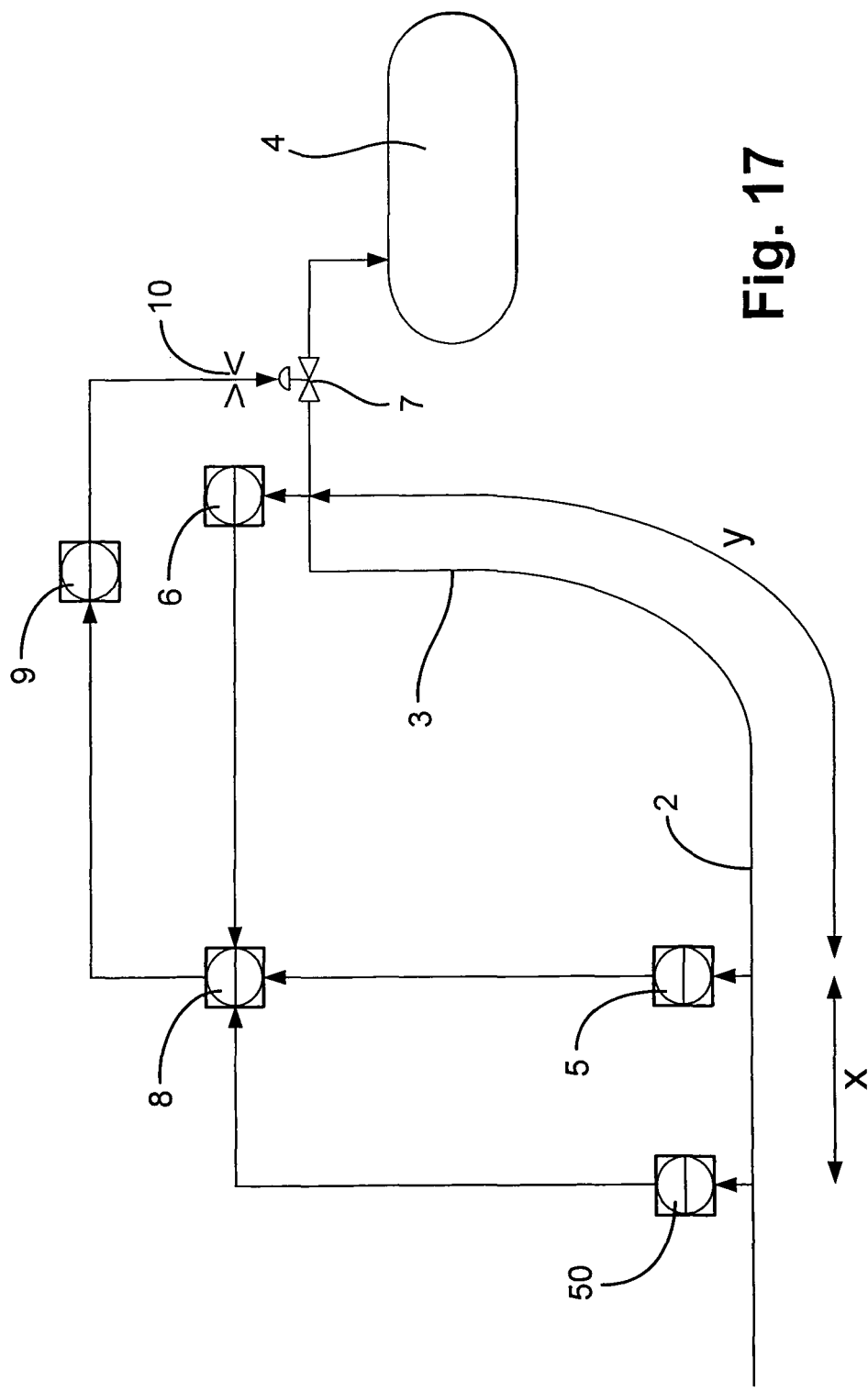
FIG. 17 is a schematic of a sixth embodiment of the invention.

FIG. 17 shows a further example of the invention. The invention according to this example has many common features with the embodiment shown in FIG. 4, and so like reference numerals refer to like components. In FIG. 17, the invention has been adapted to enable the measured differential pressure to be compensated for frictional pressure loss in order to allow the determination of the true hydrostatic head. Any embodiment of the invention may be adapted in this manner, which represents merely an example of a way in which the true hydrostatic head may be determined.

In the arrangement shown in FIG. 17, there is an additional pressure sensor 50 located upstream of the first pressure sensor 5, a distance x along a horizontal section of the pipeline 2. Data from the additional pressure sensor 50 is fed into processing means 8. This additional data allows the processing means 8 to calculate the true hydrostatic head. The true hydrostatic head calculated by the processing means 8 is passed to the PID controller 9.

In order to calculate the true hydrostatic head, the processing means 8 subtracts the frictional pressure loss from the actual pressure difference between the upstream and downstream pressures, measured by first and second sensors 5, 6 respectively. The difference in the pressures recorded by sensors 50 and 5 divided by the distance x between the two sensors 50, 5 gives a value for the frictional pressure drop per unit distance along the pipeline. Multiplying this figure by the distance y along the pipeline (which will typically be known) between first and second sensors 5, 6 gives the amount to be subtracted from the actual pressure difference across the slugging zone (i.e. as calculated from the difference between the pressures recorded by first and second sensors 5, 6) to compensate for frictional pressure loss.

Figure 15:
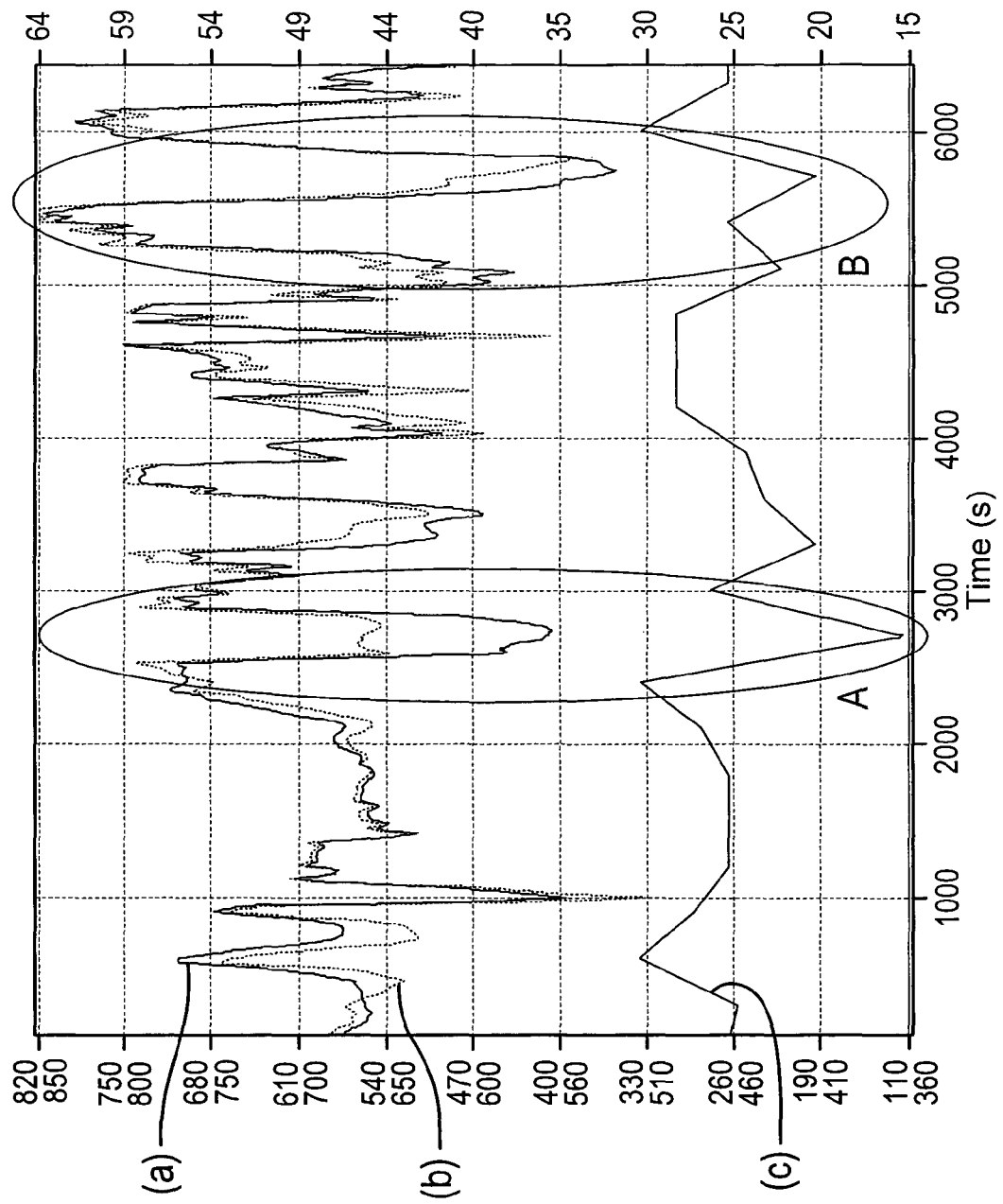
FIG. 15 shows a comparison of measurements of differential pressure with measurements of true hydrostatic head.
Figure 16:
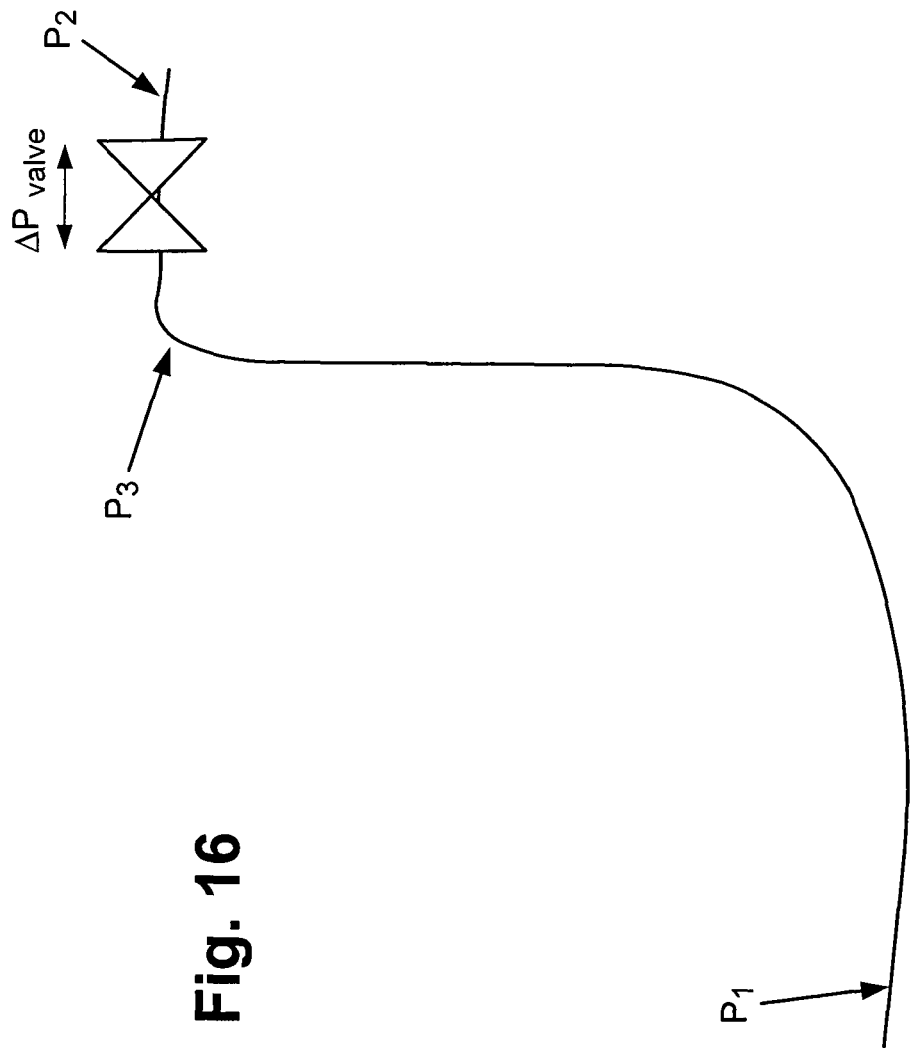
FIG. 16 shows a schematic flowline and is discussed above.

A comparison between the measured pressure difference (differential pressure) across the slugging zone and the true hydrostatic head (i.e. the measured pressure difference corrected for frictional losses) is shown in FIG. 15. In FIG. 15, the measured pressure difference (line (a)), the true hydrostatic head (line (b)) and the choke valve opening (line (c)) are plotted as a function of time. The measured pressure difference (line (a)) and the true hydrostatic head (line (b)), both measured in psig, can be read off from the left-hand y-axis, with the upper one of each pair of figures relating to the true hydrostatic head (line (b)) and the lower one relating to the measured pressure difference (line (a)), the two lines being plotted together for ease of comparison. The choke valve opening, measured in terms of a percentage of the widest possible opening, can be read off from the right-hand y-axis.

The data shown in FIG. 15 is taken from a period when the measured pressure difference was being used to control the slugging flow within a riser, the choke valve being regulated so as to minimize any variations in the measured pressure difference.

While the use of the measured pressure difference as the control variable in the present invention may realize the advantages of the invention, it may sometimes be especially beneficial to use the true hydrostatic head as the control variable. This is demonstrated in FIG. 15, in which two periods (A, B) have been circled. In Period A, a slight blow-out was followed by a return to a normal liquid hold-up profile. As the flow rate dropped, so did the pressure drop across the riser. Whilst the action of the controller was initially appropriate, the valve was closed too much, lowering the flow rate and reducing the overall measured pressure drop across the riser.

In contrast, in an effort to avoid choking back too much (and cutting the overall flow) the response was too muted in period B. As can be seen from the change in the true hydrostatic head, the size of the slug was significant and the riser should have been choked back in the same way that it was in Period A.

In order to prevent the controller choking back or opening up too much based on the measured pressure difference signal, the lower and upper limits may need to be set relatively cautiously, restricting the movements of the valve, thereby potentially limiting the response of the controller against significant slugging (as is shown in figure B).

In contrast, it will be appreciated from FIG. 15 that the true hydrostatic head (line (b)) may provide a more stable input than the measured pressure difference (line (a)). Hence, using the true hydrostatic head as the control variable may allow the controller to be tuned more aggressively without the concern that changes in the frictional pressure drop may impact the overall level of stability of the system.

Figure 14:
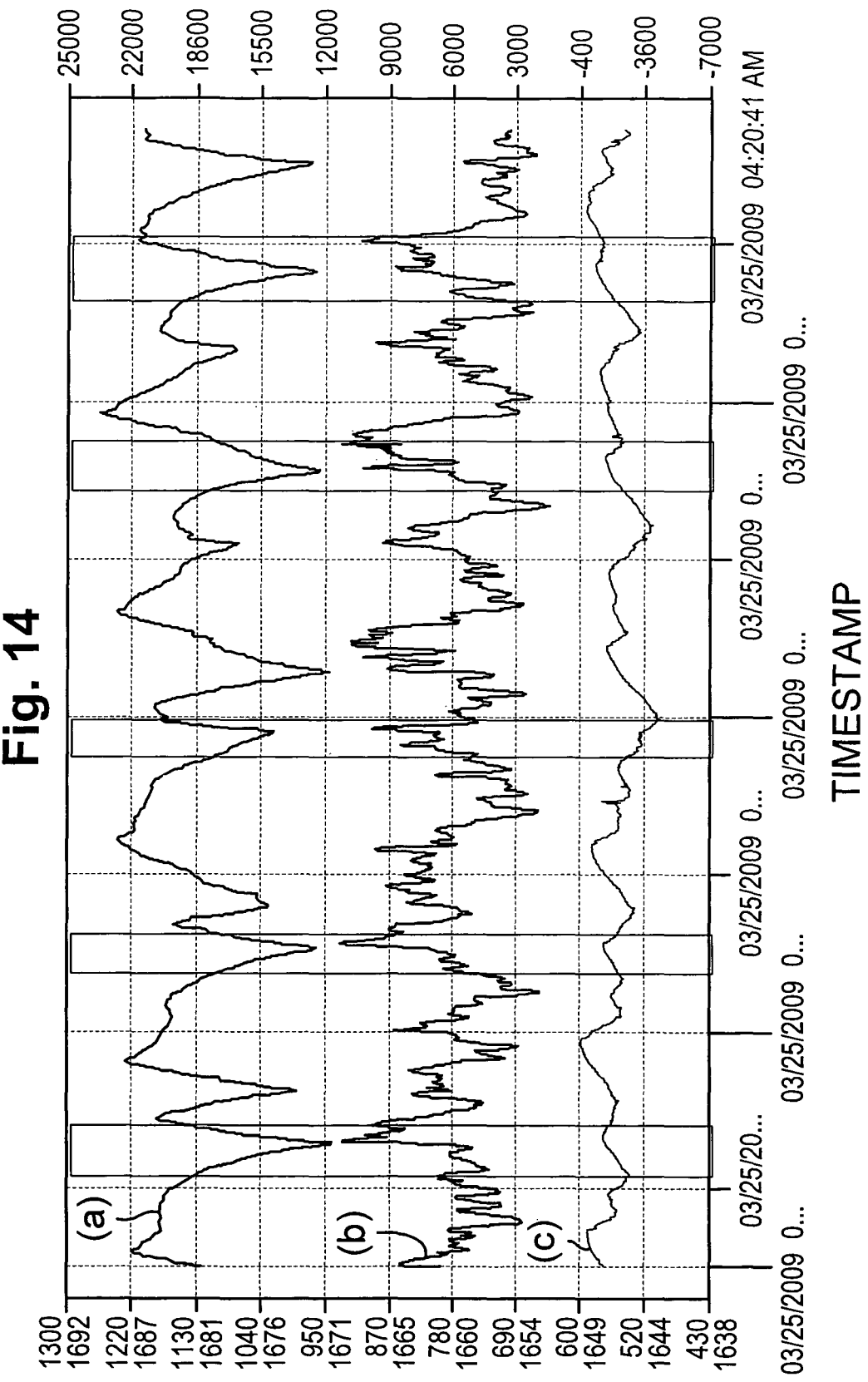
FIG. 14 shows measurements taken from a riser (B) experiencing hydrodynamic slugging.

FIG. 14 shows measurements from a riser (B) experiencing hydrodynamic slugging. In the hydrodynamic slugging profile shown in FIG. 14, line (a) is the pressure drop across the riser, line (b) is the discharge oil flow rate and line (c) is the upstream pressure. The values of the pressure drop across the riser (line (a)) and the upstream pressure (line (c)) can be read off the left-hand y-axis, with the upper one of each pair of figures on the scale referring to the pressure drop across the riser (line (a)) and the lower one referring to the upstream pressure (line (c)). Both the pressure drop and the upstream pressure are measured in units of psig. The values of the discharge oil flow rate (line (b)), in sbd, can be read off the right-hand y-axis. All three lines are plotted as a function of time, which runs along the x-axis; the time period was of around three hours' duration. It can be seen from FIG. 14 that a clear relationship appears to exist between the pressure drop across the riser (line (a)) and the discharge flow rate of oil from the riser (line (b)); as the gas bubble enters the inclined section of the conduit (the riser), the lightening of the hydrostatic head results in the rapid displacement of oil. In contrast, no clear relationship is observed between the upstream pressure (line (c)) and the flow of oil out of the riser (line (b)). Hence, it will be appreciated that the pressure drop across the riser provides a more reliable handle on hydrodynamic slugging behaviour than the upstream pressure.

The control system and method of the invention can be used to control other systems which suffer from severe and/or hydrodynamic slugging. More particularly, any system which involves the flow of fluid from a first conduit and into a second conduit which is upwardly inclined to the first conduit, which suffers from slugging, could be controlled by the present invention. For example, if slugging arose in a system in which a fluid is produced in a process in one location and then transported to a second location, such as a treatment or storage facility, where the second location is higher than the first location, the invention could be used to mitigate such slugging. Other situations where the invention could be used to mitigate slugging will be apparent to the person skilled in the art.

The invention claimed is:

1. A method of mitigating slug formation in a multiphase fluid stream that is flowing through a conduit wherein the conduit comprises a first portion and a second portion which is upwardly inclined to the first portion and wherein the multiphase fluid stream comprises a gaseous phase and a liquid phase, the method comprising the steps of:
   (a) determining the pressure in the conduit upstream of a slugging zone;
   (b) determining the pressure in the conduit downstream of the slugging zone;

(c) determining the actual pressure difference across the slugging zone by subtracting the downstream pressure from step (b) from the upstream pressure from step (a);

(d) optionally, subtracting the frictional pressure drop across the slugging zone to obtain a value for the true hydrostatic head within the slugging zone;

(e) using the actual pressure difference or the true hydrostatic head to determine the liquid hold-up or mixture density within the slugging zone;

(f) determining the error between a target pressure difference and the actual pressure difference or between a target true hydrostatic head and the actual true hydrostatic head or between a target liquid hold-up and the actual liquid hold-up or between a target mixture density and the actual mixture density;

(g) producing a signal comprising a first component which is proportional to the error and a second component which is proportional to the rate of change of the error over time; and (h) using the signal produced in step (g) to control the position of an adjustable choke valve located downstream of the slugging zone so as to stabilize variations arising in the actual pressure difference, actual true hydrostatic head, actual liquid hold-up or actual mixture density over time.

2. A method according to claim 1, wherein a proportional-integral-derivative (PID) controller is provided to produce the signal, wherein the integral coefficient of the PID controller is set to 0.

3. A method according to claim 1, comprising the additional step of inputting the upstream pressure from step (a) into a master controller which produces an output signal for automatically setting the target pressure difference, the target true hydrostatic head, the target liquid hold-up or the target mixture density.

4. A method according to claim 3, in which the master controller is a PID controller having its derivative coefficient set to zero.

5. A method according to claim 1, further including the step of imposing lower and upper limits on the produced signal before using the signal to control the position of the adjustable choke valve.

6. A method according to claim 5, in which the upper limit is up to 40%, preferably up to 20% above the lower limit.

7. A method according to claim 5 comprising the implementation of dynamic constraint limits.

8. A method according to claim 1, in which the upstream and downstream pressures are determined continuously, and the signal is produced continuously.

9. A system for mitigating slug formation in a multiphase fluid stream that is flowing through a conduit, wherein the conduit comprises a first portion and a second portion which is upwardly inclined to the first portion and wherein the multiphase fluid stream comprises a gaseous phase and a liquid phase, the system comprising:

(i) a first sensor for measuring the pressure in the conduit upstream of a slugging zone;

(ii) a second sensor for measuring the pressure in the conduit downstream of the slugging zone;

(iii) means for determining the actual pressure difference between the upstream and downstream pressure measurements;

(iv) optionally, means for determining the true hydrostatic head within the slugging zone;

(v) means for determining the liquid hold-up or mixture density within the slugging zone from the actual pressure difference or true hydrostatic head;

(iv) means for determining the error between a target pressure difference and the actual pressure difference or between a target true hydrostatic head and the actual true hydrostatic head or between a target liquid hold-up and the actual liquid hold-up or between a target mixture density and the actual mixture density; and (v) means for producing a signal comprising a first component which is proportional to the error and a second component which is proportional to the rate of change of the error over time, the signal being usable to control the position of an adjustable choke valve located downstream of the slugging zone so as to stabilize variations arising in the actual pressure difference, actual true hydrostatic head, actual liquid hold-up or actual mixture density over time.

10. A system according to claim 9, wherein the means for producing the signal comprises a PID controller in which the integral coefficient is set to zero.

11. A system according to claim 9, further including a master controller for automatically setting the target pressure difference or target true hydrostatic head or target liquid hold-up or target mixture density, the master controller having the upstream pressure measurement from the first sensor as its input.

12. A system according to claim 9, further comprising limiting means for limiting the position of the adjustable choke valve to be equal to or above a lower limit and equal to or below an upper limit.

13. A system according to claim 12 in which the upper limit is selected to be up to 40%, preferably up to 20% above the lower limit.

14. A system according to claim 12, further comprising means for implementing dynamic constraint limits.

15. A system according to claim 9, further comprising a filter adapted to filter out noise emanating from the determination of the pressures upstream and downstream of the slugging zone.

* * * * *